(12) United States Patent
Oberuc

(10) Patent No.: US 7,346,569 B2
(45) Date of Patent: Mar. 18, 2008

(54) METHOD AND APPARATUS FOR PRODUCING TIME VARIANT ASSET ALLOCATION

(75) Inventor: Richard E. Oberuc, 126 Petersburg Rd., Hackettstown, NJ (US) 07840

(73) Assignee: Richard E. Oberuc, Hackettstown, NJ (US)

( * ) Notice: Subject to any disclaimer, the term of this patent is extended or adjusted under 35 U.S.C. 154(b) by 1358 days.

(21) Appl. No.: 10/120,121

(22) Filed: Apr. 10, 2002

(65) Prior Publication Data

US 2003/0195829 A1 Oct. 16, 2003

(51) Int. Cl.
G06Q 40/00 (2006.01)
(52) U.S. Cl. .................................. 705/36 R
(58) Field of Classification Search .......... 705/35, 705/36 R
See application file for complete search history.

(56) References Cited

U.S. PATENT DOCUMENTS

| | | | | |
|---|---|---|---|---|
| 5,761,442 A * | 6/1998 | Barr et al. | ............... | 705/36 R |
| 6,021,397 A * | 2/2000 | Jones et al. | ............... | 705/36 R |
| 6,061,662 A | 5/2000 | Makivic | | |
| 6,078,904 A * | 6/2000 | Rebane | ............... | 705/36 R |
| 6,240,399 B1 | 5/2001 | Frank et al. | | |
| 6,321,212 B1 | 11/2001 | Lange | | |
| 6,336,103 B1 * | 1/2002 | Baker | ............... | 705/36 R |
| 6,912,509 B1 * | 6/2005 | Lear | ............... | 705/36 R |
| 7,016,870 B1 * | 3/2006 | Jones et al. | ............... | 705/35 |
| 2002/0123951 A1 * | 9/2002 | Olsen et al. | ............... | 705/36 |
| 2003/0014343 A1 * | 1/2003 | Jones | ............... | 705/36 |
| 2005/0033679 A1 * | 2/2005 | Rachev et al. | ............... | 705/36 |
| 2006/0200400 A1 * | 9/2006 | Hunter et al. | ............... | 705/36 R |

FOREIGN PATENT DOCUMENTS

WO WO 9928845 A1 * 6/1999
WO WO 01/93153 * 12/2001
WO WO 2004114095 A2 * 12/2004

OTHER PUBLICATIONS

"New Asset Allocation Book Takes Guesswork Out of Adjusting Investment Portfolios", PR Newswire Association, Inc. Sep. 23, 2003, 2 pages.*
BARRA, Inc. "BARRA Provides Combined Style Analysis and Asset Allocation Capabilities", BARRA Portfolio, 1996, 9 pages.*

(Continued)

*Primary Examiner*—Kambiz Abdi
*Assistant Examiner*—Jared W. Newton
(74) *Attorney, Agent, or Firm*—Kaplan Gilman Gibson & Dernier LLP; Matthew B. Dernier

(57) ABSTRACT

Methods and/or apparatus are contemplated for establishing a plurality of investments in a portfolio among which an allocation of assets is to be made; establishing one or more factors to be associated with the plurality of investments, at least one of the factors having values that are time variant; and computing the allocation of assets among the investments as one or more functions of the one or more factors such that a time variant allocation of the assets among the investments is obtained.

108 Claims, 13 Drawing Sheets

OTHER PUBLICATIONS

Harry M. Markowitz, "Portfolio Selection, Efficient Diversification of Investments," Cowles Foundation for Research in Economics at Yale University, John Wiley & Sons, Inc. pp. 154-187, 1959.

BARRA, Inc. "Barra Provides Combined Style Analysis and Asset Allocation Capabilities." BARRA Portfolio (Sep. 4, 1996).

BARRA, Inc. "Globalstyle Analyzer." Barra Portfolio (Sep. 4, 1996) at www.barra.com.

Brandt, Michael W. "Estimating Portfolio and Consumption Choice: A Conditional Euler Equations Approach." Journal of Finance 54, No. 5 (Oct. 1999): 1609-1645.

Feinstein, C. D., & M. N. Thapa. "Notes: A Reformulation of a Mean-absolute Deviation Portfolio Optimization Model." Management Science 39, No. 12 (Dec. 1993): 1552-1553.

Konno et al. "Mean-Absolute Deviation Portfolio Optimization Model and Its Applications To Tokyo Stock Market." Management Science 37, No. 5 (May 1991): 519-531.

Laroche, Jeffrey. "BARRA Announces Style Analysis for the PC." BARRA Portfolio Newsletter Winter 1994.

Markowitz, Harry M. "Efficient Diversification of Investments." Portfolio Selection. Cowles Foundation for Research in Economics at Yale U. 1959.

Oberuc, Richard E. "Using Active Asset Allocation to Improve Profits and Reduce Risk." Dynamic Portfolio Theory and Management. McGraw-Hill 2004.

Perold, Andre F. "Large-Scale Portfolio Optimization." Management Science 30, No. 10 (Oct. 1984): 1143-1160.

PR Newswire. "New Asset Allocation Book Takes Guesswork Out of Adjusting Investment Portfolios." from Gale Group site: http://www.dialogweb.com/cgi/dwclient, printed Jan. 26, 2007.

Robertsson, Göran. "Conditioning Information in Tactical Asset Allocation." Working paper, Department of Finance, Stockholm School of Economics, Stockholm, Sep. 2000.

Simaan, Y. "Estimation Risk in Portfolio Selection: The Mean Variance Model versus the Mean Absolute Deviation Model." Management Science 43, No. 10. (Oct. 1997):1437-1446.

Zenios, Stavros A., and Pan Kang. "Mean-Absolute Deviation Portfolio Optimization for Mortgaged-Backed Securities." Annals of Operations Research 45 (1993): 433-450.

Campell, J. "A Multivariate Model of Strategic Asset Allocation", Journal of Financial Economics, pp. 1-39 plus appendix (Jan. 2003).

* cited by examiner

FIG. 5

Optimization - [Factor Value Report - Stocks Bonds T-Bills (1972/1-2001/4)]

File Edit View Window

| | Year | Month | S&P Composite Common Stock: Dividend Yield (1-24) | 10-Year Treasury Constant Maturity Rate (1-12) | 1-Year Treasury Constant Maturity Rate (1-12) |
|---|---|---|---|---|---|
| 1 | 1972 | Jan | 3.4842 | 6.1592 | 4.8800 |
| 2 | 1972 | Feb | 3.4592 | 6.1350 | 4.6558 |
| 3 | 1972 | Mar | 3.4275 | 6.1325 | 4.8875 |
| 4 | 1972 | Apr | 3.3967 | 6.1633 | 4.9692 |
| 5 | 1972 | May | 3.3604 | 6.1333 | 5.0242 |
| 6 | 1972 | Jun | 3.3054 | 6.1717 | 4.9908 |
| 7 | 1972 | Jul | 3.2513 | 6.1375 | 4.9317 |
| 8 | 1972 | Aug | 3.1971 | 6.0658 | 4.8417 |
| 9 | 1972 | Sep | 3.1442 | 6.0550 | 4.7733 |
| 10 | 1972 | Oct | 3.1029 | 6.0892 | 4.7825 |
| 11 | 1972 | Nov | 3.0646 | 6.1350 | 4.8333 |
| 12 | 1972 | Dec | 3.0233 | 6.1742 | 4.8833 |
| 13 | 1973 | Jan | 2.9917 | 6.2100 | 4.9600 |
| 14 | 1973 | Feb | 2.9554 | 6.2525 | 5.0942 |
| 15 | 1973 | Mar | 2.9496 | 6.2992 | 5.2542 |
| 16 | 1973 | Apr | 2.9383 | 6.3525 | 5.4358 |
| 17 | 1973 | May | 2.9346 | 6.3925 | 5.5933 |
| 18 | 1973 | Jun | 2.9333 | 6.4525 | 5.7808 |
| 19 | 1973 | Jul | 2.9317 | 6.5183 | 5.9792 |
| 20 | 1973 | Aug | 2.9279 | 6.6033 | 6.2650 |
| 21 | 1973 | Sep | 2.9271 | 6.7025 | 6.5850 |
| 22 | 1973 | Oct | 2.9268 | 6.7475 | 6.8175 |
| 23 | 1973 | Nov | 2.9242 | 6.7733 | 6.9742 |
| 24 | 1973 | Dec | 2.9263 | 6.8108 | 7.1658 |
| 25 | 1974 | Jan | 2.9552 | 6.8425 | 7.3117 |
| 26 | 1974 | Feb | 2.9796 | 6.8867 | 7.4392 |
| 27 | 1974 | Mar | 3.0167 | 6.9133 | 7.4567 |
| 28 | 1974 | Apr | 3.0496 | 6.9550 | 7.5725 |

402

G Growth | S Statistics | C Coefficient | A Allocation | F Factor | I Investment 402A   400A

DATE RANGE;
DESIRED RETURN;
PORTFOLIO THRESHOLD;
MIN/MAX ASSET ALLOCATIONS FOR
RESPECTIVE INVESTMENTS;
TRANSACTION COSTS (BUY/SELL);
MIN/MAX LEVERAGE;

LIST OF FACTORS;
FACTOR HISTORY;
LIST OF INVESTMENTS;
INVESTMENT HISTORY;

OBJECTIVE FUNCTION;
CONSTRAINT EQUATION(S);

FIG. 13

Optimization - [Statistics Report - Stocks Bonds T-Bills (1972/1-2001/4)]

| | Statistic | Portfolio | Stock Index - S&P Total Return One Month | Long Government | T-Bills 90 Day Calculated Monthly |
|---|---|---|---|---|---|
| 1 | 1 Month Arithmetic Avg | 1.0000 | 1.1115 | 0.7632 | 0.5389 |
| 2 | 12 Month Arithmetic Avg | 12.0000 | 13.3377 | 9.1589 | 6.4669 |
| 3 | 1 Month Geometric Avg | 0.9695 | 1.0113 | 0.7226 | 0.5387 |
| 4 | 12 Month Geometric Avg | 12.2749 | 12.8337 | 9.0229 | 6.6594 |
| 5 | Highest Month | 8.6041 | 16.7100 | 14.2300 | 1.2663 |
| 6 | 95% High | 5.3192 | 7.7790 | 5.8435 | 1.0065 |
| 7 | 90% High | 4.0532 | 6.1980 | 4.0160 | 0.7872 |
| 8 | 90% Low | -1.7473 | -3.8110 | -2.5560 | 0.3281 |
| 9 | 95% Low | -2.8623 | -5.6630 | -3.7515 | 0.2641 |
| 10 | Lowest Month | -7.8811 | -21.5400 | -8.4100 | 0.2353 |
| 11 | 1 Month Mean Absolute Deviation | 1.8090 | 3.3792 | 2.1437 | 0.1592 |
| 12 | 1 Month Standard Deviation | 2.4892 | 4.4718 | 2.8799 | 0.2054 |
| 13 | 12 Month Standard Deviation | 8.6229 | 15.4908 | 9.9762 | 0.7114 |
| 14 | Maximum Drawdown | 13.5328 | 42.5711 | 20.1180 | 0.0000 |
| 15 | Risk Free Interest Rate | 0.0000 | 0.0000 | 0.0000 | 0.0000 |
| 16 | Sharpe Ratio | 1.4235 | 0.8285 | 0.9044 | 9.3613 |
| 17 | Correlation with Threshold | | | | |

410

US 7,346,569 B2

METHOD AND APPARATUS FOR PRODUCING TIME VARIANT ASSET ALLOCATION

BACKGROUND OF THE INVENTION

The present invention relates to methods and apparatus for producing a time variant asset allocation among a plurality of investments and, more particularly, to producing an allocation equation that may be utilized to predict a substantially optimal allocation of assets among the investments at one or more points in time.

It is desirable to determine an optimal allocation of assets among a plurality of investments (i.e., an investment portfolio). For example, an investor may wish to distribute his assets among investments A, B, and C. The investor's return on the portfolio will depend on the respective market values of investments A, B, and C, as well as the distribution of his assets by percentage among these investments (i.e., the allocation of his assets). It is self evident that the investor would like to maximize his return on the investment portfolio by selecting an advantageous allocation of assets among the investments.

In keeping with the desire to maximize the return on an investment portfolio, those skilled in the art have sought to develop procedures for determining an advantageous allocation of assets among a plurality of investments. For example, the so-called Markowitz model was developed in the early 1950s to compute a desirable allocation of assets among a plurality of investments based on historical relationships among the investments. More particularly, the Markowitz model is frequently implemented by requiring that the average returns of the respective investments and the standard deviations of those returns are computed for a particular historical period. A correlation matrix is then determined, which defines the extent to which the investments are linked (i.e., correlated) in terms of their market values over the historical period. The Markowitz model then uses a quadratic programming routine to compute an asset allocation among the investments that minimizes the square of the standard deviation of the returns of the investment portfolio. Inputs to the quadratic programming routine include a desired average return (for the investment portfolio set by the investor), the average returns for each investment, the standard deviations of these returns, and the correlation matrix. The resultant asset allocation is fixed as a function of time.

Unfortunately, the asset allocation obtained via the Markowitz model has significant drawbacks. For example, the Markowitz asset allocation does not provide an asset allocation that is time variant. Consequently, the investor must either use a fixed asset allocation and hope for the best over time, or recompute the average rates of return for each investment, the standard deviation of these returns, and the correlation matrix to determine a new asset allocation for a new time period. The new asset allocation, however, would be heavily skewed by the historical average of the returns of each investment and, therefore, would not provide satisfactory asset allocations, particularly for short term distributions (e.g., monthly, weekly, daily, etc.).

Further disadvantages of the Markowitz model include that it does not permit other market factors to affect the asset allocation and, therefore, the computed asset allocation cannot be influenced by, for example, leading market indicators. By way of example, many investments may be affected by inflation rates and, thus, it would be beneficial to adjust asset allocations based on them. Since the Markowitz model relies heavily on the historic performance of the portfolio investments (e.g., the average return), the Markowitz model has no mechanism for directly adjusting the asset allocation based on changes in current inflation rates. This could result in highly undesirable asset allocations when there is a significant disparity between average and current inflation rates over a relevant historical period. For example, a particular inflation rate may have averaged ten percent during the relevant historical period, but the current inflation rate may be three percent. The Markowitz model, however, would at best yield an asset allocation corresponding to the ten percent level.

Another model was developed by Konno and Yamazaki in the early 1990s to compute asset allocations among a plurality of investments. In their process, the historical monthly returns for each investment of the portfolio are used in a linear programming routine to minimize a sum of differences between the rates of return of the investments and an minimum desired rate of return. Like the Markowitz model, the Konno and Yamazaki model yields an asset allocation that is time invariant. Thus, the asset allocation computed by the Konno and Yamazaki model represents an average allocation for use in long term investing. The Konno and Yamazaki model is not equipped to provide an investor with the information needed to make short term asset allocation changes, such as monthly, weekly, daily, etc.

Accordingly, there is need in the art for new methods and apparatus for determining time variant asset allocations among a plurality of investments based, among other things, on market factors such that the investor can quickly respond to changing market conditions.

SUMMARY OF THE INVENTION

In accordance with one or more aspects of the present invention a method or apparatus is operable to facilitate the steps of establishing a plurality of investments in a portfolio among which an allocation of assets is to be made; establishing one or more factors to be associated with the plurality of investments, at least one of the factors having values that are time variant; and computing the allocation of assets among the investments as one or more functions of the one or more factors such that a time variant allocation of the assets among the investments is obtained.

Other aspects, features, advantages, etc. of the present invention will be apparent to one skilled in the art in view of the description herein taken in conjunction with the accompanying drawings.

BRIEF DESCRIPTION OF THE DRAWINGS

For the purpose of illustrating various aspects of the invention, there are shown in the drawings forms that are presently preferred, it being understood, however, that the invention is not limited to the precise arrangements and instrumentalities shown.

FIG. 5 is an example of a report screen containing historical data for one or more factors that may be used to compute the asset allocation in accordance with one or more aspects of the invention;

FIG. 8 is an example of a suitable data file containing information that may be used to compute the asset allocation in accordance with one or more aspects of the invention;

FIG. 13 is an example of a report screen containing data concerning statistical performance information for the investments of the portfolio in accordance with one or more aspects of the present invention.

DETAILED DESCRIPTION OF THE INVENTION

Figure 1:
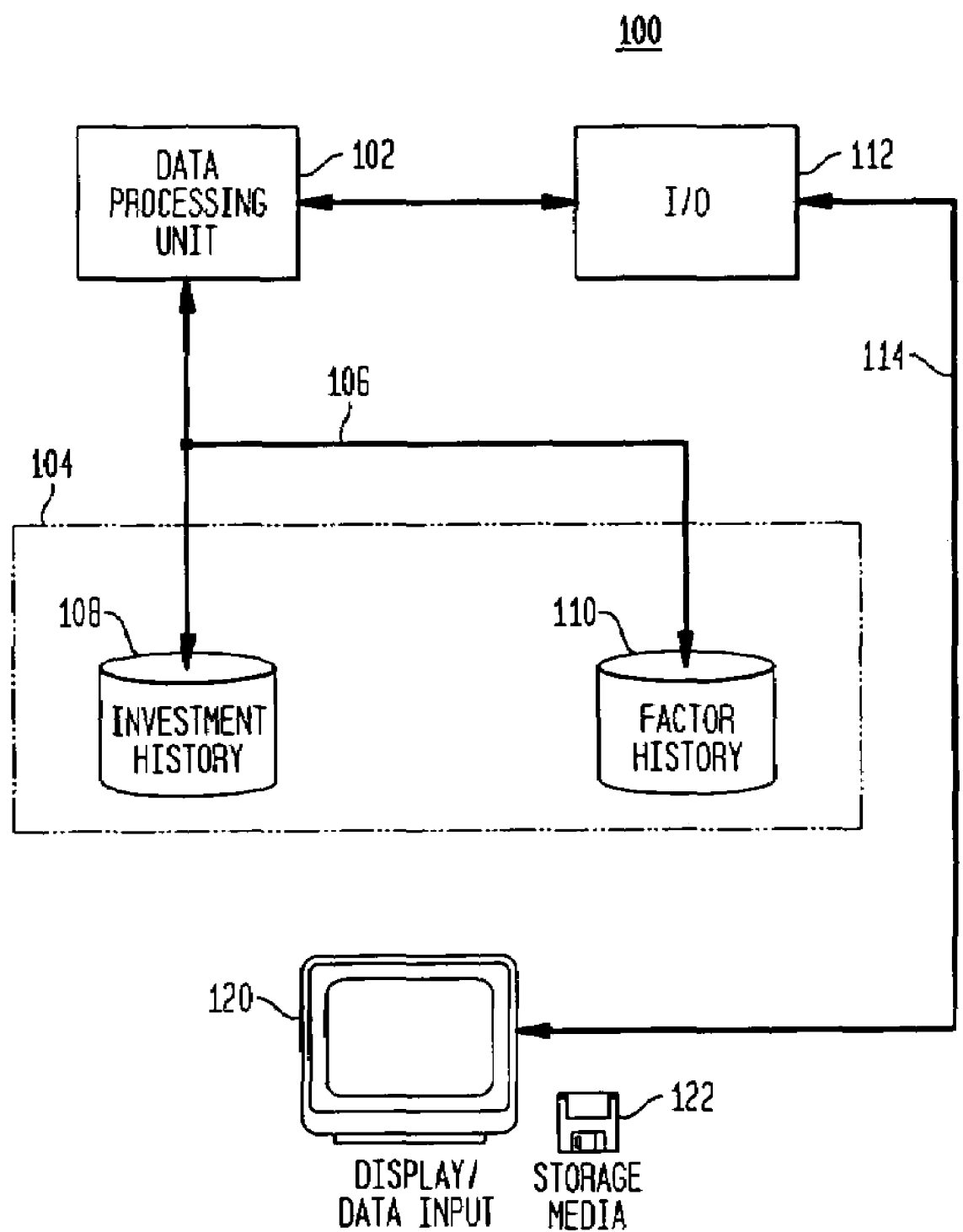
FIG. 1 is a block diagram illustrating one example of a system suitable for computing an allocation of assets among a plurality of investments of a portfolio in accordance with one or more aspects of the present invention.

Referring now to the drawings, wherein like numerals indicate like elements, there is shown in FIG. 1 a block diagram illustrating an example of a system 100 for computing an allocation of assets among a plurality of investments of a portfolio in accordance with one or more aspects of the present invention. The system 100 preferably includes a data processing unit 102 and a memory 104 operatively coupled by way of a data and/or instruction bus 106. The data processing unit 102 may be implemented utilizing any of the known hardware, such as a digital and/or analog microprocessor, a computer (such as a portable, a stationary and/or a distributed computing system), or any of the other known and/or hereinafter developed processing units. The memory 104 preferably includes an investment history database 108 and a factor history database 110. The memory 104 may be implemented by way of separate hardware or may be disposed within the data processing unit 102. Any of the known hardware and/or software for implementing the databases 106 and/or 110 may be employed, such as the commercially available CodeBase 6 database engine that may be utilized with a computer.

Data are preferably input to, and output from, the data processing unit 102 by way of an input/output device 112 that is operatively coupled to a display/data input device 120 via a data and/or instruction link 114. By way of example, the display/data input device 120 may include a display screen, such as any of the commercially available CRTs, LCDs, etc. The display/data input device 120 may also include any of the commercially available input devices, such as a keyboard, a mouse, a voice recognition system, etc.

A user of the system 100, such as an investor, preferably utilizes the display/data input device 120 to provide information to the data processing unit 102 over the data and/or instruction link 114 to facilitate the computation of one or more asset allocations (and/or the computation of one or more asset allocation equations) in accordance with the invention. The data processing unit 102 preferably provides information concerning the portfolio, such as the allocation of assets, to the investor by way of the display/data input device 120. A storage medium 122, such as a magnetic storage medium, an optical storage medium, etc. may also be utilized to provide information to, and receive information from, the data processing unit 102, e.g., by way of an appropriate storage medium reading device (not shown).

It is noted that the term "investor" herein is used broadly to include one or more individual investors, one or more institutional investors, their agents and their representatives, etc.

It is noted that the functional blocks illustrated in FIG. 1 may be partitioned as shown or may be partitioned in any other way, such as in an integral fashion. By way of example, the system 100 may be implemented utilizing a portable, stationary, or distributed computer operating under one or more suitable computer programs. Further, one or more of the functional blocks of the system 100 may be remotely located from the others, such as in a distributed (e.g., networked) system. For example, the display/data input device 120 may be remotely located from the other functional blocks of the system 100, where the link 114 may be an electronic communication network, such as the Internet.

Figure 2:
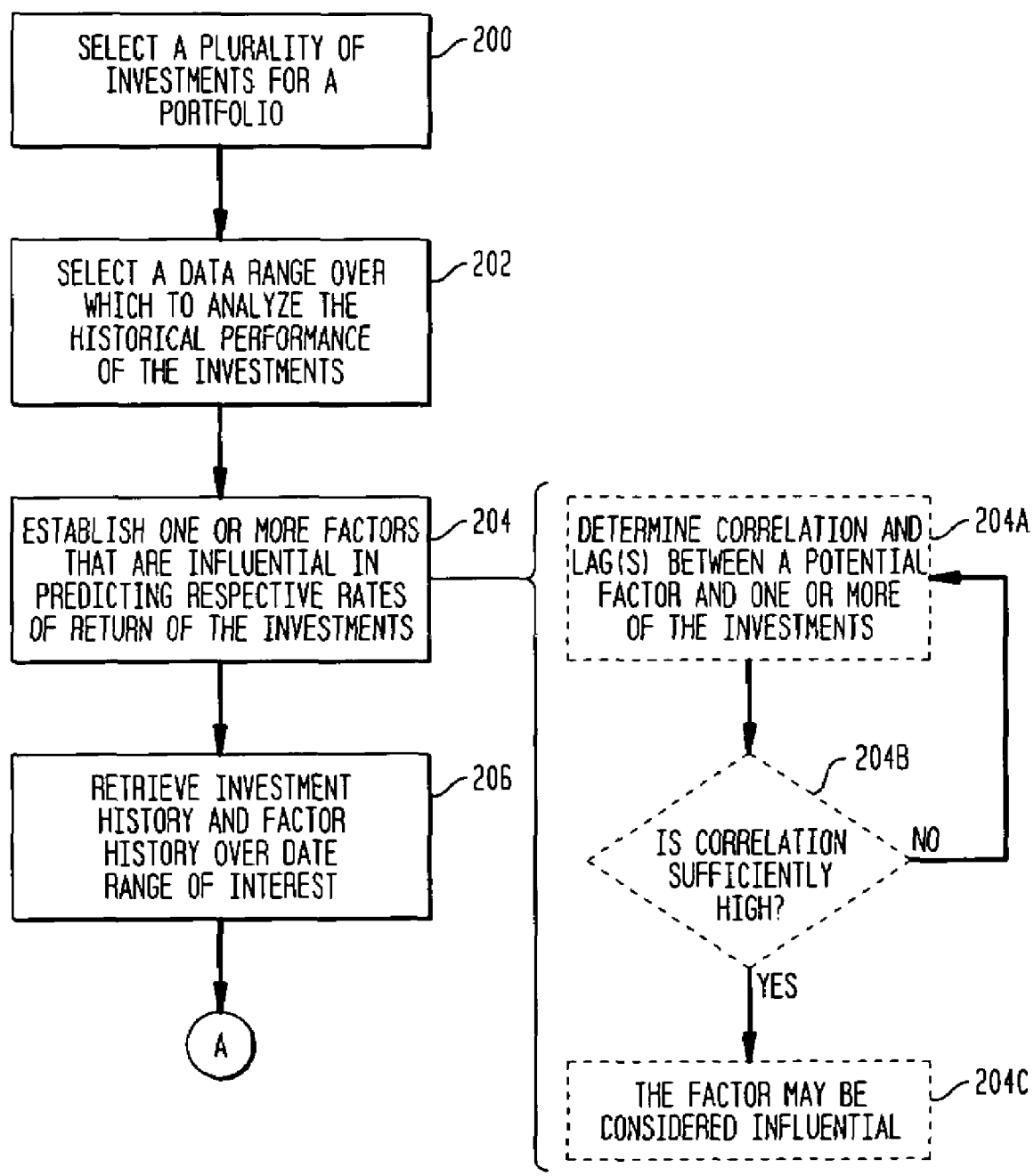
FIG. 2. is a partial flow diagram illustrating process steps and/or functions that may be utilized to compute the asset allocation in accordance with one or more aspects of the invention.

Irrespective of how the system 100 is implemented and/or partitioned, it preferably carries out a method (e.g., a process) for computing an allocation of assets in accordance with one or more aspects of the invention such that a time variant allocation of the assets among the investments is obtained. To this end, reference is now made to FIG. 2, which is a partial flow diagram illustrating at least some steps and/or functions of this method. At action 200, the investor preferably selects a plurality of investments for the portfolio and makes this information available to the data processing unit 102. By way of example, and with reference to FIG. 3, the investor may provide information to the data processing unit 102 by way of a setup screen 300A that may be presented to the investor on the display/data input device 120. Any of the known processing techniques for producing the setup screen 300A may be employed without departing from the spirit and scope of the invention.

In the illustrated example, the setup screen 300A includes a plurality of fields, among them an investment input field 302, through which the investor may select the plurality of investments for the portfolio. In a first area 302A of the investment input field 302, a source of information from which the investments are selected is identified; in this case, the source is the user (or investor). The selected investments of the portfolio are preferably listed in a second area 302B of the investment input field 302. In this example, the investor has selected a stock index, a government bond, and the 90 day T-Bill. Preferably, the source of investment information may be changed by way of a drop-down menu box 302C and the selection of a particular investment may be made via a drop-down menu box 302D (together with an appropriate add, insert, or delete command, e.g., made using point and click techniques on activation areas 302E).

Referring again to FIG. 2, at action 202 a selection is preferably made as to a date range over which to analyze the historical performance of the investments of the portfolio. Preferably, this selection is made by the investor utilizing a setup screen, which may be the setup screen 300A of FIG. 3 or may be another setup screen. In this embodiment of the invention, the selection of the date range is preferably made by the investor using the setup screen 300B of FIG. 7. Further details as to how the investor uses the setup screen 300B of FIG. 7 (including how to select the date range) will be discussed later in this description.

Figure 3:
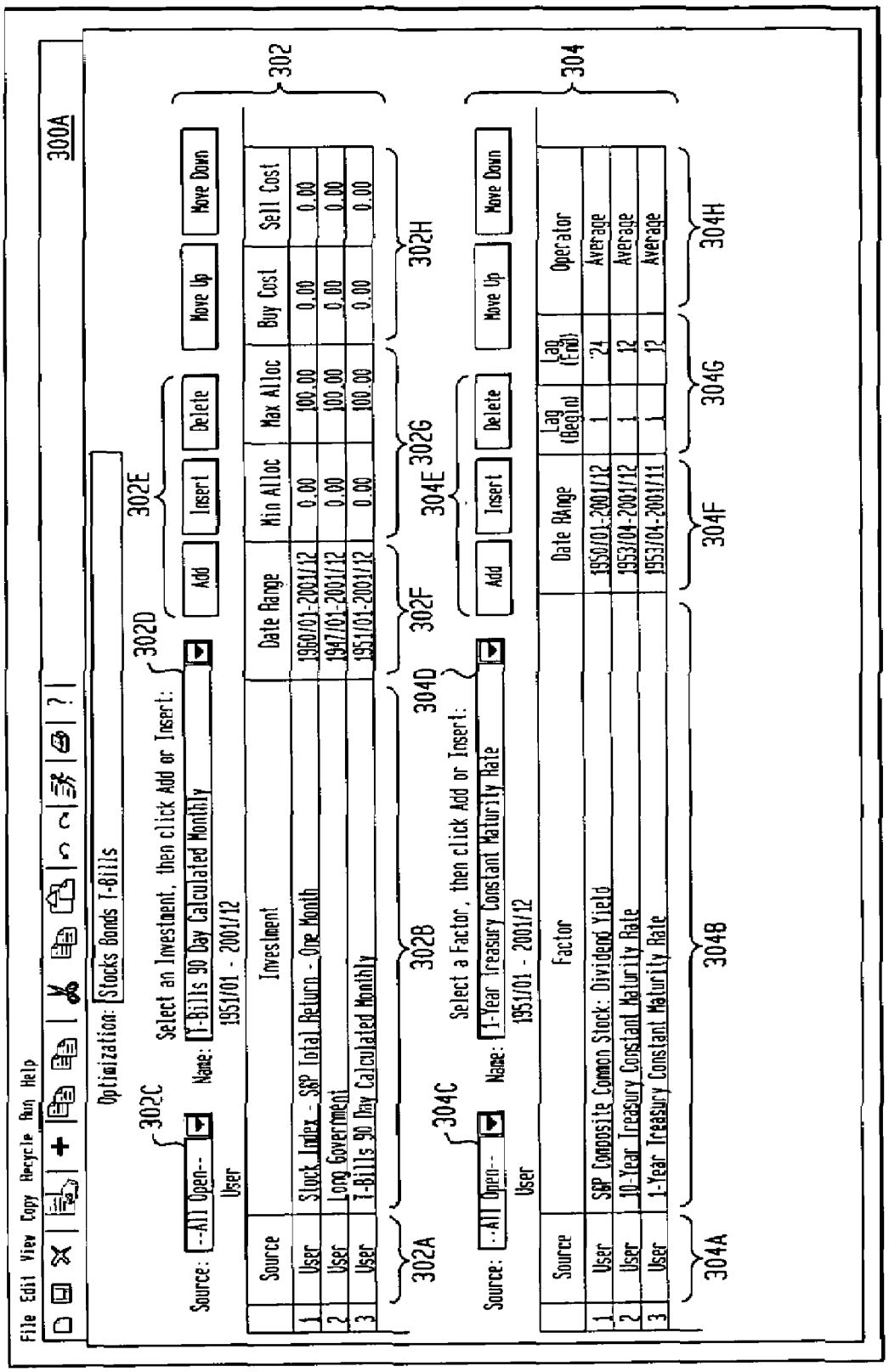
FIG. 3 is an example of at least part of a setup screen that may be utilized in accordance with one or more aspects the invention to receive data and/or instructions from an investor in order to produce an asset allocation.

At action 204 one or more factors are preferably established that are influential in predicting respective rates of return of the investments of the portfolio. As used herein, the term "factor" relates to any market factor, such as any macroeconomic factor (e.g., interest rate(s), inflation rate(s), GNP, unemployment rate(s), trade deficit, etc.), commodity prices, stock prices, bond prices, etc. Preferably the investor may select the factors and input them into the data processing unit 102 by way of the setup screen 300A (FIG. 3). More particularly, the setup screen 300A preferably includes a factor input field 304 including a first area 304A and a second area 304B that are respectively used to identify a source of the factor information and to specify the selected factors themselves. In this example, the following factors have been established: the S&P composite common stock dividend yield, the 10-year treasury rate, and the 1-year treasury rate.

As with the investment input field 302, the factor input field 304 preferably includes a drop-down menu box 304C for identifying and/or altering the source of the factor information, a drop-down menu box 304D for identifying and/or altering the selection of a particular factor, and add, insert, and delete selection areas 304E for facilitating the selection of the factors (e.g., using point and click techniques). The factor input field 304 also preferably includes a third area 304F in which to display the available data date ranges for each factor.

Any of the known techniques may be employed to determine whether a given factor should be used. By way of example, a determination as to the correlation (and lags) between a potential factor and one or more of the investments may be made (action 204A, FIG. 2). This determination may be made utilizing any of the known regression algorithms, such as those that employ auto correlation techniques, for quantifying relationships between respective time series. At action 204B, a determination is made as to whether the correlation obtained in action 204A is sufficiently high to suggest that the potential factor should be used (action 204C) or that the correlation is not sufficiently high (return to action 204A or end).

Figure 4:
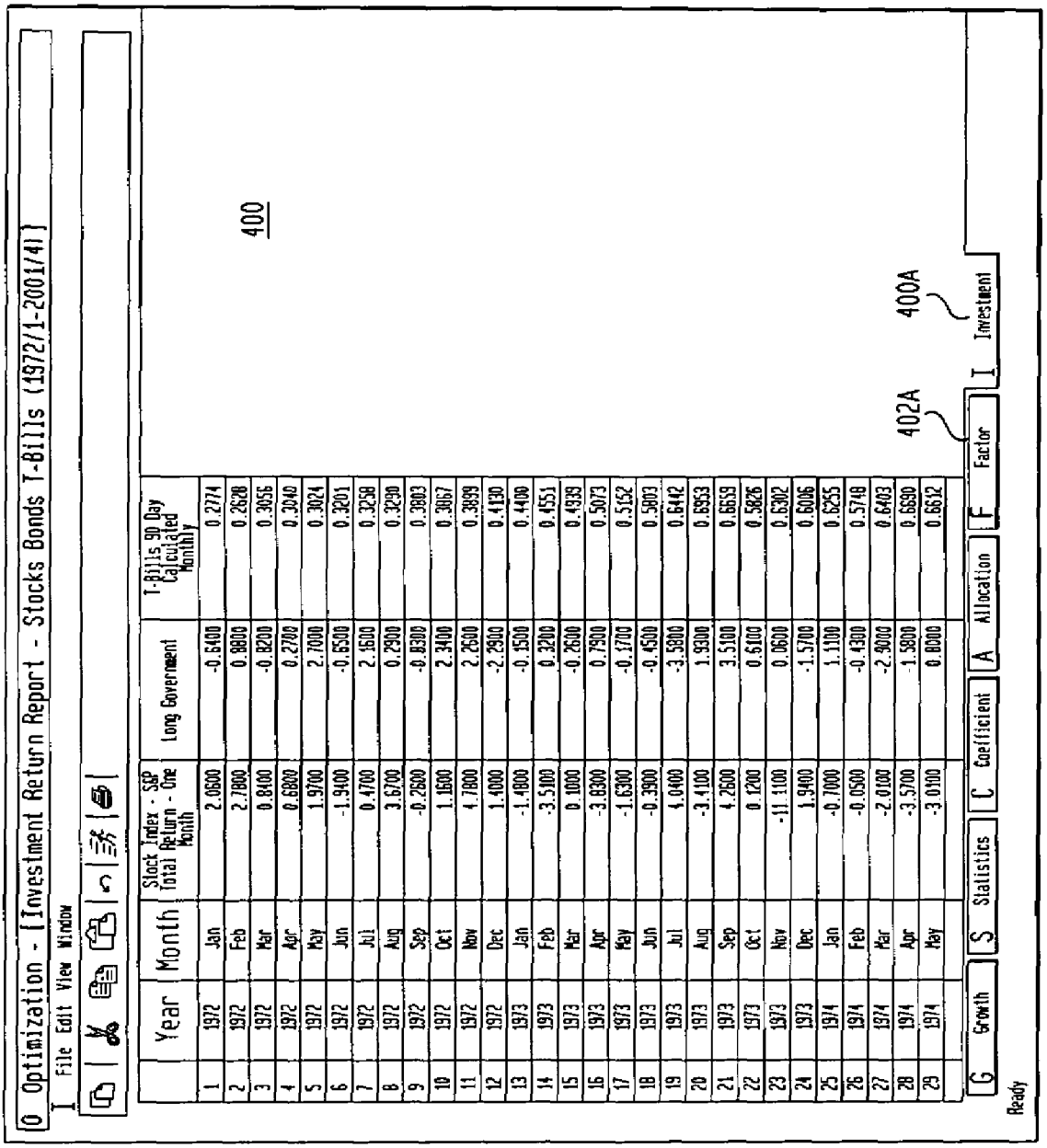
FIG. 4 is an example of a report screen containing historical data for the investments of a portfolio suitable for use in accordance with one or more aspects of the invention.

At action 206, the investment history and factor history over the date range of interest is preferably retrieved. With reference to FIG. 1, this historical data is preferably read from the investment history-database 108 and the factor history database 110. In accordance with the invention, the investment history data is preferably accessible and viewable by the investor via the display/data input device 120. By way of example, FIG. 4 illustrates a report screen 400 containing a tabulation of the respective returns of the investments of the portfolio on an historic basis (e.g., the monthly returns in 1972, 1973, 1974, etc.). Any of the known (or hereafter developed) techniques for generating the report screen 400 (and/or for generating further report screens discussed below) may be employed, such as using the commercially available Rogue Wave, Stingray Studio software program that is operable to run on known computers. Similarly, the investor is preferably permitted to access and view the factor history by way of the display/data input device 120, for example, by way of a report screen 402 (FIG. 5) containing a tabulation of the historical data concerning the factors. Preferably, the investor may readily select the reports 400, 402 by activating respective areas 400A and 402A (e.g., using point and click techniques).

Figure 6:
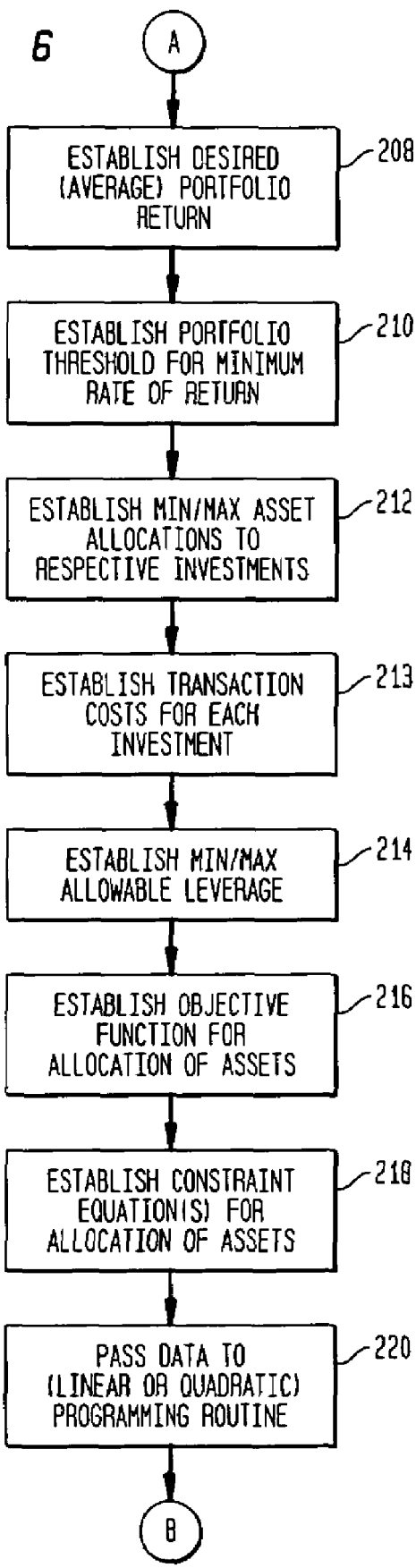
FIG. 6 is a further partial flow diagram illustrating further process steps and/or functions that may be utilized to compute the asset allocation in accordance with one or more aspects of the invention.

With reference to the further flow diagram of FIG. 6, a variety of parameters utilized in computing the asset allocation(s) (and/or the asset allocation equation(s)) in accordance with the invention are preferably established. These include establishing a desired average portfolio return (action 208), establishing a threshold for a minimum rate of return for the portfolio (action 210), establishing minimum and maximum asset allocations for each of the investments of the portfolio (action 212), establishing transaction costs for each investment (action 213), establishing minimum and maximum allowable leverage ratios (action 214), establishing an objective function (action 216), and establishing constraint equations for determining the allocation of assets (action 218). Preferably, these parameters are established through user input (e.g., via the display/data input device 120, FIG. 1) or by way of an automated process executed by the data processing unit 102.

Figure 7:
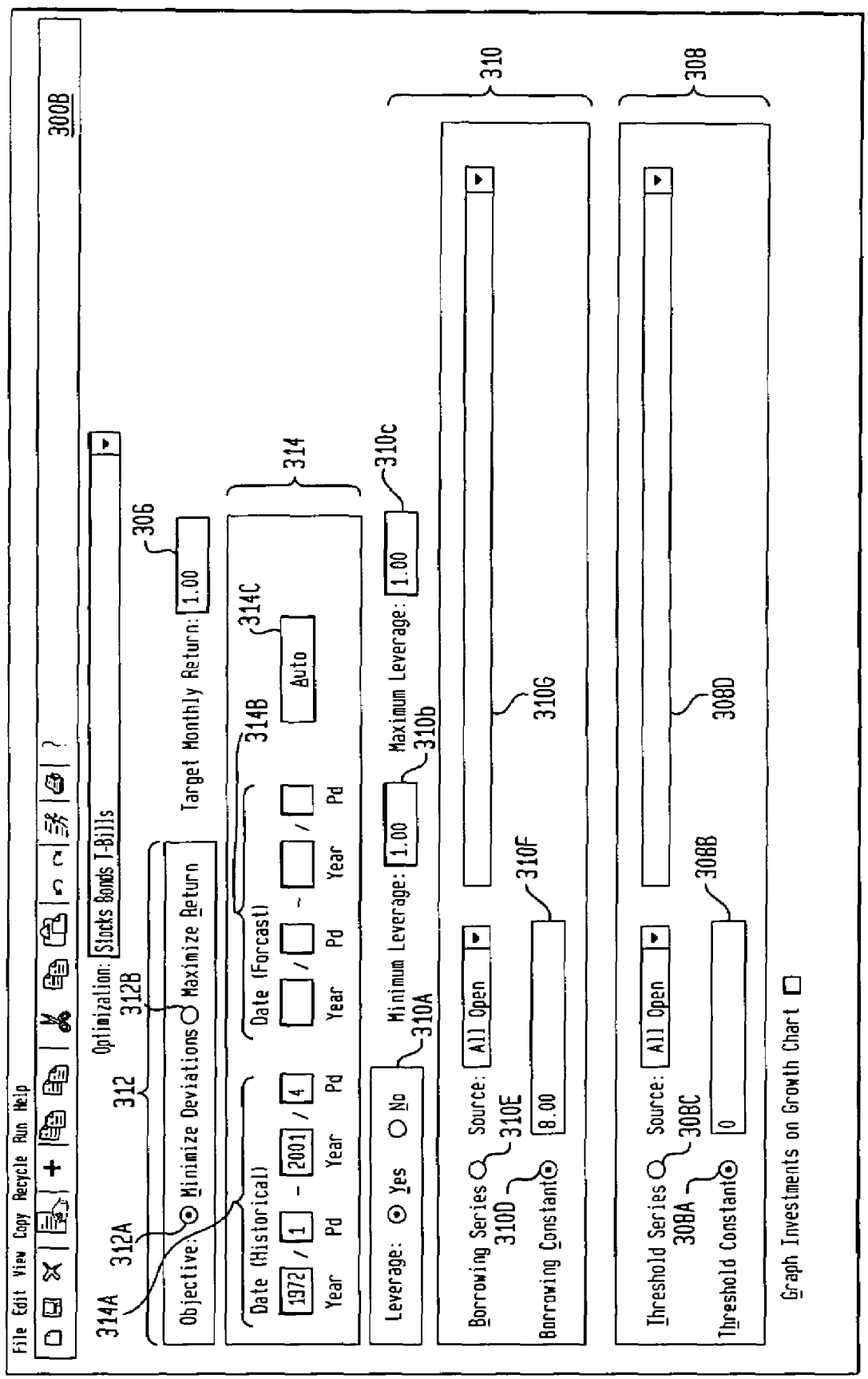
FIG. 7 is an example of at least part of a further screen that may be utilized in accordance with one or more aspects of the invention to receive data and/or instructions from the investor in order to produce an asset allocation.

More particularly, and with reference to FIG. 7, the setup screen 300B (which may be separate from or may be a further portion of setup screen 300A) may be utilized to establish the parameters listed above. For example, setup screen 300B preferably includes an input area 306 into which the investor may enter a desired portfolio return, for example, a target monthly return of 1.00. The setup screen 300B also preferably includes a threshold input field 308 in which the investor may specify the threshold for minimum rate of return of the portfolio. It is noted that this threshold may be a constant, which is preferably specified by selecting area 308A and inputting a constant in area 308B, such as zero. Alternatively, the threshold may be specified by way of a time series by selecting area 308C and inputting a series of threshold values in area 308D, one value for each time period of interest.

As discussed above, the investor preferably selects and establishes the date range over which to analyze the historical performance of all of the investments of the portfolio (action 202 of FIG. 2) using the setup screen 300B. This is preferably done by inputting the date range into field 314, specifically area 314A. The area 314 includes an area 314B (which will be discussed later in this description) and an area 314C. Area 314C may be used by the investor to set the historical date range to the widest possible range based on the available date range of data (which is found at area 302F of FIG. 3).

The minimum and maximum asset allocations are preferably established by way of setup screen 300A (FIG. 3) via investor input at area 302G (e.g., a minimum allocation of zero percent (0%) and a maximum allocation of one-hundred percent (100%) for each investment).

The transaction costs (representing a percentage of each change in allocation) are preferably established by way of setup screen 300A via investor input at area 302H. A separate transaction cost can be established for each investment for transactions that add to allocations (Buy Cost) or decrease allocations (Sell Cost). These transaction costs represent such items as commissions, exchange fees, administrative fees, execution slippage and any other expense charged as a percentage of the value of an investment allocation change. If no fee is to be charged for a particular investment, the Buy Cost and Sell Cost can be established as zero. The transaction costs for all investments for all changes in allocation within one time period decrease the rate of return for the portfolio within that time period.

Establishing the minimum and maximum allowable leverage (action 214, FIG. 6) is preferably made by way of a leverage input field 310 of the setup screen 300B (FIG. 7). More particularly, the investor is preferably permitted to select whether leveraged investments are permitted by way of area 310A and, if so, entering a minimum leverage ratio and a maximum leverage ratio at areas 310B and 310C, respectively. When leveraged investment is used, the investor preferably enters a borrowing constant or a borrowing time series by selecting one of areas 310D and 310E, respectively, and entering the constant or series at area 310F or 310G.

The objective function (action 216, FIG. 6) is preferably established by way of investor input at field 312. Those skilled in the art will appreciate that the objective function may be a mathematical expression that represents a main goal for the portfolio, which goal is to be achieved through allocating the investor's assets among the investments of the portfolio.

In this example, the investor may select an objective function of "minimizing deviations" (by selecting area 312A) or of "maximizing return" by selecting area 312B. As used herein, minimizing deviations means substantially minimizing a sum of the differences between the rate of return of the portfolio and the minimum rate of return threshold for the portfolio over time periods of interest. The objective function of maximizing return as used herein preferably means substantially maximizing an average of the rates of return of the portfolio over a plurality of time periods of interest. As will be discussed more fully hereinbelow, these are but two examples of suitable objective functions that may be used in accordance with one or more aspects of the invention. It is understood that other objective functions are contemplated without departing from the spirit and scope of the invention. For example, the objective function may be taken from the following group:

(i) substantially minimizing a sum of the differences between a rate of return of the portfolio and a minimum rate of return threshold for the portfolio over a plurality of time periods;

(ii) substantially minimizing a sum of squares of the differences between the rate of return of the portfolio and the minimum rate of return threshold for the portfolio over a plurality of time periods;

(iii) substantially minimizing a variance of the rates of return of the portfolio over a plurality of time periods;

(iv) substantially maximizing a Sharpe ratio of the rates of return of the portfolio over a plurality of time periods; and (v) substantially maximizing an average of the rates of return of the portfolio over a plurality of time periods.

Further details concerning these objective functions will now be provided. Turning to the first listed objective function (i), it is preferred that the sum of the differences between the rate of return of the portfolio and the minimum rate of return threshold for the portfolio over a plurality of time periods, may be expressed as:

$$(1/M) \cdot \sum_{t=1}^{M} (R_t - T_t),$$

where M is a maximum number of time periods over which the sum of the differences between the rate of return of the portfolio and the minimum rate of return threshold for the portfolio may be taken, $R_t$ is the rate of return of the portfolio at time period t, and $T_t$ is the minimum rate of return threshold for the portfolio at time t.

Preferably, the sum is computed only when $(R_t - T_t)$ is negative since, in this example, the goal for the portfolio (i.e., the objective) is to substantially minimize the sum of differences between the rate of return of the portfolio and the minimum rate of return threshold (i.e., when the rate of the return of the portfolio falls below the threshold). This may be achieved by permitting the difference of the rate of return of the portfolio and the minimum rate of return threshold for the portfolio at time period t, to be expressed as:

$$R_t - T_t = V_t - Z_t,$$

where $Z_t$ is the difference of $R_t$ and $T_t$ at time period t when such difference is negative and zero otherwise, and $V_t$ is the difference of $R_t$ and $T_t$ at time period t when such difference is positive and zero otherwise.

Turning to the second listed objective function (ii), it is preferred that the sum of squares of the rates of return of the portfolio, over a plurality of time periods, that fall below the minimum rate of return threshold for the portfolio, may be expressed as:

$$(1/M) \cdot \sum_{t=1}^{M} (R_t - T_t)^2$$

In this case, the sum is also preferably computed only when $(R_t - T_t)$ is negative.

Turning to the third listed objective function (iii), it is preferred that the variance of the rates of return of the portfolio over a plurality of time periods, may be expressed as:

$$(1/M-1) \cdot \sum_{t=1}^{M} (R_t - R_{avg})^2,$$

where M is a maximum number of time periods over which the sum of squares of rates of return of the portfolio may be taken, and $R_{avg}$ is the average of the rates of return of the portfolio over the M time periods.

When the objective function involves the Sharpe ratio, the fourth listed objective function (iv), such ratio of the rates of return of the portfolio over a plurality of time periods is preferably expressible as:

$$(R_{avg} - RF) / ((1/M-1) \cdot \sum_{t=1}^{M} (R_t - R_{avg})^2)^{1/2},$$

where RF is a substantially risk free interest rate available to an investor associated with the portfolio.

When the objective function involves substantially maximizing the average of the rates of return of the portfolio over a plurality of time periods, the fifth listed objective function (v), such computation is preferably expressible as:

$$R_{avg} = (1/M) \cdot \sum_{t=1}^{M} \left( \left( \sum_{j=1}^{N} AA_{jt} \cdot y_{jt} \right) + (1 - LEV_t) \cdot I_t \right),$$

where N is a maximum number of the plurality of investments, $AA_{jt}$ is an asset allocation given to a jth one of the investments during time period t, $y_{jt}$ is a rate of return of a jth one of the investments at time period t, $LEV_t$ is a leverage ratio employed during time period t, and $I_t$ is an interest rate during time period t on money borrowed to leverage the portfolio.

When transaction costs are to be included in computing asset allocations, the objective function for $R_{avg}$ is preferably modified to include positive or negative changes in the asset allocation for each investment between a previous time period and a current time period and a transaction cost for each investment associated with such positive or negative change in asset allocation. Preferably, the average return in this scenario is expressable as:

$$R_{avg} = (1/M) \cdot$$

$$\sum_{t=1}^{M} \left( \left( \sum_{j=1}^{N} AA_{jt} \cdot y_{jt} \right) + (1 - LEV_t) \cdot I_t - \sum_{j=1}^{N} DP_{jt} \cdot CP_j - \sum_{j=1}^{N} DN_{jt} \cdot CN_j \right),$$

where $DP_{jt}$ is the absolute value of the change in allocation for investment j between time period t−1 and time period t whenever such change in allocation is positive and zero otherwise, $DN_{jt}$ is the absolute value of the change in allocation for investment j between time period t−1 and time period t whenever such change in allocation is negative and zero otherwise, $CP_j$ is the transaction cost for each unit of investment j for each transaction involving a positive change in the allocation to investment j, $CN_j$ is the transaction cost for each unit of investment j for each transaction involving a negative change in the allocation to investment j, and the transaction costs for time period t=1 are defined to be zero.

Preferably the constraint equations (action 218, FIG. 6) are established automatically by the data processing unit 102 in response to at least some of the previously entered parameters, such as the desired portfolio return (action 208), the threshold for minimum rate of return of the portfolio (action 210), the minimum and maximum asset allocations to each investment (action 212), the minimum and maximum allowable leverage (action 214), the selected objective function (action 216).

It is noted that the constraint equations are generally useful in ensuring that the asset allocation solution results in an achievable distribution (e.g., no negative allocations, etc.). Examples of useful constraint equations are preferably taken from the following group:

(i) that a leverage ratio employed during a given time period is substantially equal to a function of the values of the one or more factors during that time period;

(ii) that a rate of return of the portfolio in a given time period is substantially equal to a function of at least one of the asset allocations for each investment in that time period, rates of return of the investments in that time period, a leverage ratio employed during that time period, an interest rate during that time period on any money borrowed to leverage the portfolio, and transaction costs associated with the investments;

(iii) that a sum of the asset allocations for the investments is substantially equal to unity during a given time period;

(iv) that the sum of the asset allocations for the investments is substantially equal to the leverage ratio during the given time period;

(v) that an average rate of return of the portfolio over a plurality of time periods is substantially equal to an average of the rates of return of the portfolio in each of the plurality of time periods;

(vi) that the average rate of return of the portfolio over a plurality of time periods is substantially equal to a target average rate of return for the portfolio;

(vii) that the asset allocation for a given one of the investments is less than or substantially equal to a maximum permissible allocation for the investment as a proportion of all allocated assets;

(viii) that the asset allocation for a given one of the investments is greater than or substantially equal to a minimum permissible allocation for the investment as a proportion of all allocated assets;

(ix) that the leverage ratio employed during a given time period is less than or substantially equal to a maximum permissible leverage;

(x) that the leverage ratio employed during a given time period is greater than or substantially equal to a minimum permissible leverage;

(xi) that a sum of differences between a rate of return of the portfolio and a minimum rate of return threshold for the portfolio over a plurality of time periods, is less than or substantially equal to a maximum permissible average deviation below the minimum rate of return threshold for the portfolio;

(xii) that a sum of squares of differences between the rate of return of the portfolio and the minimum rate of return threshold for the portfolio over a plurality of time periods, is less than or substantially equal to a maximum permissible average square deviation below the minimum rate of return threshold for the portfolio;

(xiii) that a variance of the rates of return of the portfolio over a plurality of time periods is less than or substantially equal to a maximum permissible variance; and (xiv) that a Sharpe ratio of the rates of return of the portfolio over a plurality of time periods is greater than or substantially equal to a minimum permissible Sharpe ratio.

Further details regarding these constraint equations will now be given. Preferably, the constraint equation listed above at (i), i.e., that the leverage ratio employed during a given time period is substantially equal to a function of the values of the one or more factors during that time period, may be expressed as:

$$LEV_t = C \prod_{k=1}^{K} F_{kt}{}^{\wedge}(P_k),$$

where $LEV_t$ is the leverage ratio employed during time period t, C is a constant associated with the leverage, and $P_k$ represents a power for a kth one of the factors.

Most preferably, this constraint equation may be preferably expressed as:

$$LEV_t = C + \sum_{k=1}^{K} D_k \cdot F_{kt},$$

where $LEV_t$ is the leverage ratio employed during time period t, C is a constant, and $D_k$ is a coefficient associated with a kth one of the factors.

Preferably, the constraint equation listed above at (ii), i.e., that the rate of return of the portfolio in a given time period is substantially equal to a function of the asset allocations for each investment in that time period, rates of return of the investments in that time period, a leverage ratio employed during that time period, and an interest rate during that time period on any money borrowed to leverage the portfolio, may be expressed as:

$$R_t = \left(\sum_{j=1}^{N} AA_{jt} \cdot y_{jt}\right) + (1 - LEV_t) \cdot I_t,$$

where $AA_{jt}$ is the asset allocation for a jth one of the investments during time period t, N is a maximum number of the plurality of investments, $y_{jt}$ is a rate of return of a jth one of the investments at time period t, $LEV_t$ is a leverage ratio employed during time period t, and $I_t$ is an interest rate during time period t to be paid on money borrowed to leverage the portfolio.

When transaction costs are to be considered in computing the asset allocations, the rate of return, $R_t$, is preferably modified to include positive or negative changes in the asset allocation for each investment between a previous time period and a current time period and a transaction cost for each investment associated with such positive or negative change in asset allocation. Preferably, the rate of return in this scenario may be expressed as:

$$R_t = \left(\sum_{j=1}^{N} AA_{jt} \cdot y_{jt}\right) + (1 - LEV_t) \cdot I_t - \sum_{j=1}^{N} DP_{jt} \cdot CP_j \sum_{j=1}^{N} DN_{jt} \cdot CN_j,$$

where $DP_{jt}$ is the absolute value of the change in allocation for investment j between time period t−1 and time period t whenever such change in allocation is positive and zero otherwise, $DN_{jt}$ is the absolute value of the change in allocation for investment j between time period t−1 and time period t whenever such change in allocation is negative and zero otherwise, $CP_j$ is the transaction cost for each unit of investment j for each transaction involving a positive change in the allocation to investment j, $CN_j$ is the transaction cost for each unit of investment j for each transaction involving a negative change in the allocation to investment j, and the transaction costs for time period t=1 are defined to be zero.

Preferably, the constraint equation listed above at (iii), i.e., that the sum of the asset allocations for the investments is substantially equal to unity during the given time period, may be expressed as:

$$\sum_{j=1}^{N} AA_{jt} = 1,$$

where $AA_{jt}$ is the asset allocation for a jth one of the investments during time period t, and N is a maximum number of the plurality of investments.

Preferably, the constraint equation listed above at (iv), i.e., that the sum of the asset allocations for the investments is substantially equal to the leverage ratio during the given time period, may be expressed as:

$$\sum_{j=1}^{N} AA_{jt} = LEV_t,$$

where $AA_{jt}$ is the asset allocation for a jth one of the investments during time period t, N is a maximum number of the plurality of investments, and $LEV_t$ is a leverage ratio employed during time period t.

Preferably, the constraint equation listed above at (v), i.e., that the average rate of return of the portfolio over a plurality of time periods is substantially equal to an average of the rates of return of the portfolio in each of the plurality of time periods, may be expressed as:

$$R_{avg} = (1/M) \cdot \sum_{t=1}^{M} R_t,$$

where $R_{avg}$ is the average of the rates of return of the portfolio over a plurality of time periods, M is a maximum number of time periods over which the sum of rates of return of the portfolio may be taken, and $R_t$ is the rate of return of the portfolio in time period t.

Preferably, the constraint equation listed above at (vi), i.e., that the average rate of return of the portfolio over a plurality of time periods is substantially equal to a target average rate of return for the portfolio, may be expressed as:

$$R_{avg} = R_{target} = (1/M) \cdot \sum_{t=1}^{M} R_t,$$

where $R_{avg}$ is the average of the rates of return of the portfolio over a plurality of time periods, $R_{target}$ is a desired target average rate of return for the portfolio, M is a maximum number of time periods over which the sum of rates of return of the portfolio may be taken, and $R_t$ is the rate of return of the portfolio in time period t.

Preferably, the constraint equation listed above at (vii), i.e., that the asset allocation for a given one of the investments is less than or substantially equal to about a maximum permissible allocation for the investment, may be expressed as:

$$AA_{jt} \leq \text{amax}_j \cdot LEV_t,$$

where $amax_j$ is a maximum permissible allocation as a proportion of all allocated assets for a jth one of the investments, and $LEV_t$ is a leverage ratio employed during time period t.

Preferably, the constraint equation listed above at (viii), i.e., that the asset allocation for a given one of the investments is greater than or substantially equal to about a minimum permissible allocation for the investment, may be expressed as:

$$AA_{jt} \geq amin_j \cdot LEV_t,$$

where $amin_j$ is a minimum permissible allocation as a proportion of all allocated assets for a jth one of the investments, and $LEV_t$ is a leverage ratio employed during time period t.

Preferably, the constraint equation listed above at (xi), i.e., that the sum of the differences between the rate of return of the portfolio and a minimum rate of return threshold for the portfolio over a plurality of time periods, is less than or substantially equal to a maximum permissible average deviation below the minimum rate of return threshold for the portfolio, may be expressed as:

$$(1/M) \cdot \sum_{t=1}^{M} |Z_t| \leq DEV_{max},$$

where M is a maximum number of time periods over which the sum of rates of return of the portfolio may be taken, $Z_t$ is a difference of the rate of return of the portfolio and the minimum rate of return threshold for the portfolio at time period t, and $DEV_{max}$ is the maximum permissible average deviation below the minimum rate of return threshold. In this case, the sum of $Z_t$ is computed only for negative values of $Z_t = (R_t - T_t)$, where $R_t$ is the rate of return of the portfolio at time period t, and $T_t$ is the minimum rate of return threshold for the portfolio.

Preferably, the constraint equation listed above at (xii), i.e., that the sum of squares of the differences between the rate of return of the portfolio and the minimum rate of return threshold for the portfolio over a plurality of time periods, is less than or substantially equal to a maximum permissible average square deviation below the minimum rate of return threshold for the portfolio, may be expressed as:

$$(1/M) \cdot \sum_{t=1}^{M} Z_t^2 \leq DEV_{max}^2,$$

where M is a maximum number of time periods over which the sum of squares of rates of return of the portfolio may be taken, $Z_t$ is a difference of the rate of return of the portfolio and the minimum rate of return threshold for the portfolio at time period t, and $DEV^2_{max}$ is the maximum permissible average square deviation below the minimum rate of return threshold. In this case, the sum of $Z_t^2$ is computed only for negative values of $Z_t = (R_t - T_t)$, where $R_t$ is the rate of return of the portfolio at time period t, and $T_t$ is the minimum rate of return threshold for the portfolio.

Preferably, the constraint equation listed above at (xiii), i.e., that the variance of the rates of return of the portfolio over a plurality of time periods is less than or substantially equal to a maximum permissible variance, may be expressed as:

$$(1/(M-1)) \cdot \sum_{t=1}^{M} (R_t - R_{avg})^2 \leq VAR_{max},$$

where M is a maximum number of time periods over which the sum of rates of return of the portfolio may be taken, $R_t$ is the rate of return of the portfolio in time period t, $R_{avg}$ is the average of the rates of return of the portfolio over a plurality of time periods, and $VAR_{max}$ is the maximum permissible variance.

Preferably, the constraint equation listed above at (xiv), i.e., that the Sharpe ratio of the rates of return of the portfolio over a plurality of time periods is greater than or substantially equal to a minimum permissible Sharpe ratio, may be expressed as:

$$(R_{avg} - RF)/\left((1/(M-1)) \cdot \sum_{t=1}^{M} (R_t - R_{avg})^2\right)^{1/2} \geq SHARPE_{min},$$

where M is a maximum number of time periods over which the sum of rates of return of the portfolio may be taken, $R_t$ is the rate of return of the portfolio in time period t, $R_{avg}$ is the average of the rates of return of the portfolio over a plurality of time periods, RF is a substantially risk free interest rate available to an investor associated with the portfolio, and $SHARPE_{min}$ is the minimum permissible Sharpe ratio.

Referring again to FIG. 6, at action 220, a data file is preferably passed to a programming routine, such as a linear or quadratic programming routine in order to facilitate the computation of the asset allocation. Preferably, this data is passed by way of an electronic file, such as the electronic file illustrated in FIG. 8, and includes one or more of the following data: the date range, the desired portfolio return, the threshold for minimum rate of return, the minimum and maximum asset allocations for the respective investments, the buy and sell transaction costs, the minimum and maximum allowable leverage, the list of economic factors, the history of the factors over the date range of interest, the list of investments of the portfolio, the investment history over the date range of interest, information concerning the objective function, and information concerning the constraint equations.

By way of example, a linear programming routine is preferably employed when the objective function involves substantially minimizing the sum of the differences between the rate of return of the portfolio and the minimum rate of return threshold for the portfolio. Conversely, a quadratic programming routine is preferably employed when the objective function involves substantially minimizing the sum of squares of the differences between the rate of return of the portfolio and the rate of return threshold for the portfolio. Any of the known linear or quadratic program routines may be employed without departing from the spirit and scope of the invention. For example, the commercially available Lingo 7.0 linear/non-linear programming package may be employed, which runs on conventional computers. Preferably, the electronic data file (FIG. 8) is tailored to provide the requisite data to the linear or non-linear programming routine; in this example, the electronic data file is preferably tailored for the Lingo 7.0 programming software.

Figure 9:
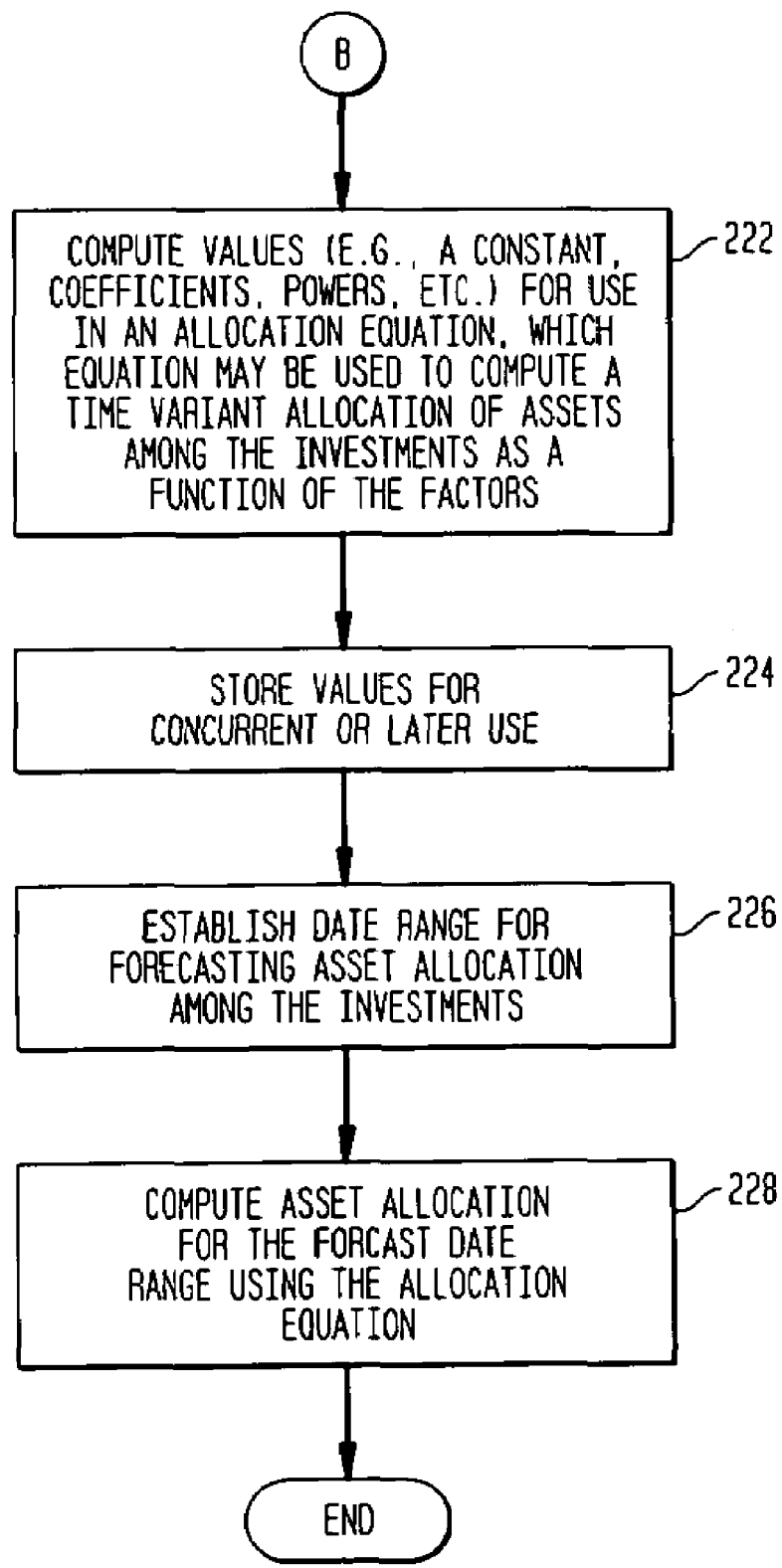
FIG. 9 is a further partial flow diagram illustrating further process steps and/or functions that may be utilized to compute the asset allocation in accordance with one or more aspects of the present invention.

With reference to the further flow diagram of FIG. 9, at action 222, the linear or non-linear programming routine preferably is executed by the data processing unit 102 to compute values for use in an allocation equation, which may be used to compute a time variant allocation of assets among the investments as a function of the factors. Preferably, the one or more allocation equations for each of the investments may be expressed as:

$$AA_{jt}=f(F_{kt}),$$

where j is an index representing each of the plurality of investments, t is an index representing time periods, $AA_{jt}$ is an asset allocation for a jth one of the investments in time period t, k is an index representing each of the one or more factors, and $F_{kt}$ represents a value of a kth one of the factors at time period t.

More particularly, the one or more allocation equations for each of the investments may be expressed as:

$$AA_{jt} = A_j \cdot \prod_{k=1}^{K} F_{kt}{}^{\wedge}(P_{kj}),$$

where $A_j$ is a constant of proportionality associated with a jth one of the investments, K is a maximum number of the one or more factors and $P_{kj}$ represents a power for a kth one of the factors and a jth one of the investments.

Most preferably, the one or more allocation equations for each of the investments may be expressed as:

$$AA_{jt} = A_j + \sum_{k=1}^{K} B_{kj} \cdot F_{kt},$$

where $A_j$ is a constant associated with a jth one of the investments, K is a maximum number of the one or more factors and $B_{kj}$ represents a coefficient for a kth one of the factors and a jth one of the investments.

In this case, the linear programming routine preferably computes the constant $A_j$ and the coefficients $B_{kj}$ for each of the one or more factors. As noted above, the one or more factors include historical values and, therefore, the constant and the coefficients of the above allocation equations are preferably computed as functions of the historical values of the factors. It is noted that the computation of the constant $A_j$ and the coefficients $B_{kj}$ are preferably determined in a way that tends towards optimizing the objective function (such as substantially minimizing the sum of the differences between the rate of return of the portfolio and the minimum rate of return threshold for the portfolio). More particularly, the constant $A_j$ and coefficients $B_{kj}$ are most preferably computed in a way that tends towards optimizing the objective function and satisfying the one or more constraint equations. It is most preferred that the linear programming routine (or the non-linear programming routine) is operable to compute the constant $A_j$ and the coefficients $B_{kj}$ such that positive and/or negative values are permitted.

When the investor has established that leveraged investments may be permitted, then it is preferred that the constraint equations include at least one of the leverage constraint equations discussed hereinabove. By way of example, the constraint equation listed above at (i) may be employed, i.e., that the leverage ratio employed during a given time period is substantially equal to a function of the values of the one or more factors during that time period. Recall that this constraint may be expressed as:

$$LEV_t = C + \sum_{k=1}^{K} D_k \cdot F_{kt},$$

where $LEV_t$ is the leverage ratio employed during time period t, C is a constant, and $D_k$ is a coefficient associated with a kth one of the factors.

When such a constraint equation is utilized, the programming routine preferably simultaneously computes the constant $A_j$, the coefficients $B_{kj}$, the constant C, and the coefficients $D_k$. Again, it is preferred that the programming routine is operable to compute the constant $A_j$, the coefficients $B_{kj}$, the constant C, and the coefficients $D_k$ such that positive and negative values are permitted.

Figure 10:
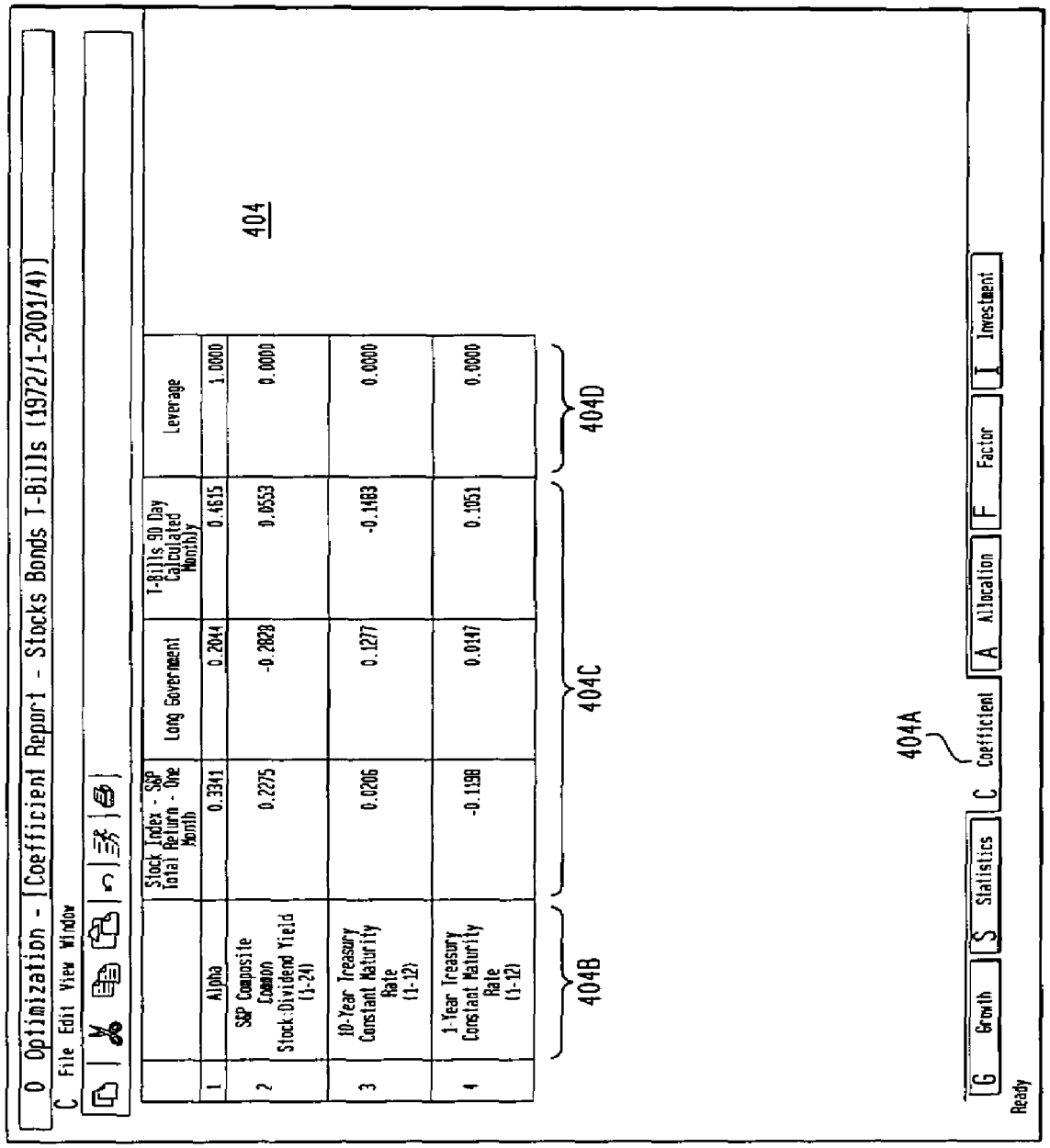
FIG. 10 is an example of a report screen containing information that may be utilized to define one or more allocation equations for the respective investments of the portfolio in accordance with one or more aspects of the invention.

Referring again to FIG. 9, the constant $A_j$, the coefficients $B_{kj}$, the constant C, and the coefficients $D_k$ are preferably stored (e.g., in memory 104, FIG. 1) for concurrent or later use (action 224). Preferably, the investor is permitted to view these values by way of the display/data input device 120. For example, and with reference to FIG. 10, the data processing unit 102 preferably provides a report screen 404 to the display/data input device 120 that contains a tabulation of constant $A_j$, the coefficients $B_{kj}$, the constant C, and the coefficients $D_k$ as related to the investments of the portfolio and the factors. It is noted that the report screen 404 is preferably made available to the investor when area 404A is activated by the investor (e.g., via point and click techniques). More particularly, the report screen 404 preferably lists the factors in area 404B and lists the investments at area 404C. Leverage information is preferably found at area 404D. It is noted that in this example, the minimum and maximum leverage ratios were set to 1.00, i.e., no leveraged investment was contemplated. Accordingly, the coefficients $D_k$ are all zero.

Turning to a first one of the investments of the portfolio, e.g., the S&P stock index, the value of the constant $A_1$ was computed to be 0.3341, the value of coefficient $B_{1,1}$ was computed to be 0.2275, the value of coefficient $B_{2,1}$ was computed to be 0.0206, and the value of coefficient $B_{3,1}$ was computed to be −0.1198. The asset allocation for this investment may be placed into the form $$AA_{jt} = A_j + \sum_{k=1}^{K} B_{kj} \cdot F_{kt},$$

as follows:

$$AA_{1,t}=0.3341+0.2275 \cdot F_{1,t}+0.0206 \cdot F_{2,t}-0.1198 \cdot F_{3,t}$$

Using the above form for $A_{jt}$, the asset allocations for the other investments, namely, the long term government bond and the 90 day T-Bill may be expressed respectively as follows:

$$AA_{2,t}=0.2044-0.2828 \cdot F_{1,t}+0.1277 \cdot F_{2,t}+0.0147 \cdot F_{3,t}$$

$$AA_{3,t}=0.4615+0.0553 \cdot F_{1,t}-0.1483 \cdot F_{2,t}+0.1051 \cdot F_{3,t}$$

Referring again to FIG. 9, at action 226, a date range of interest for forecasting a desired asset allocation among the investments is established. Preferably, this date range is obtained by way of investor input, e.g., by entering the date range into the setup screen 300B (FIG. 7) at area 314B. By way of example, the date range may be entered by year and month, although any other time increments may be employed without departing from the scope of the invention.

At action 228, the asset allocation among the investments of the portfolio are preferably computed for the forecasted date range using the allocation equations. More particularly, the values of the factors at the time of interest are entered into the asset allocation equations to compute the desired allocations. In this sense, the asset allocation is time variant because the allocation is a function of the time variant values of the factors.

It is noted that the way in which the values of the factors are utilized in the asset allocation may be adjusted. For example, the beginning and ending lags of the factor values may be specified by inputting them at area 304G of the setup screen 300A (FIG. 3). Further, a particular operator may be specified at area 304H. These operators may include (i) an average, (ii) a sum, (iii) a minimum, (iv) a maximum, (v) compound, and (vi) a product.

Figure 11:
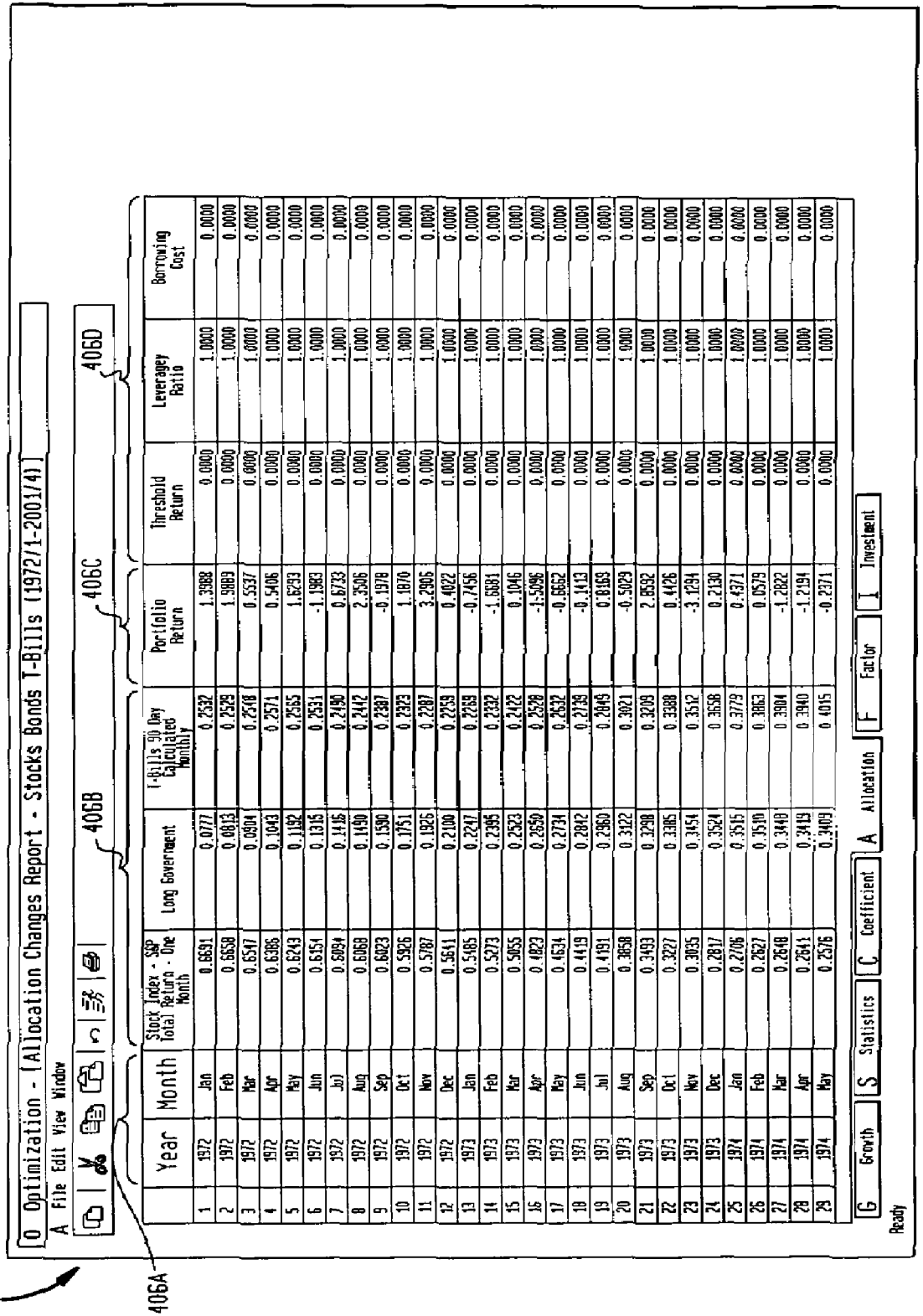
FIG. 11 is an example of a report screen containing data showing historical and/or predicted asset allocations for the investments of the portfolio in accordance with one or more aspects of the present invention.

With reference to FIG. 11, the investor is preferably permitted to view the time variant asset allocation by way of a report screen 406 displayed on the display/data input device 120. The report screen 406 preferably includes the date/time period at area 406A, a list of the investments and their respective asset allocations at area 406B, the rate of return on the portfolio at area 406C, and further information at area 406D, such as the minimum rate of return threshold, the leverage ratio, and the cost of borrowing money for leveraged investing. As can be seen in area 406A, the time period of interest may include historical time periods as well as future (forecasted) time periods.

Figure 12:
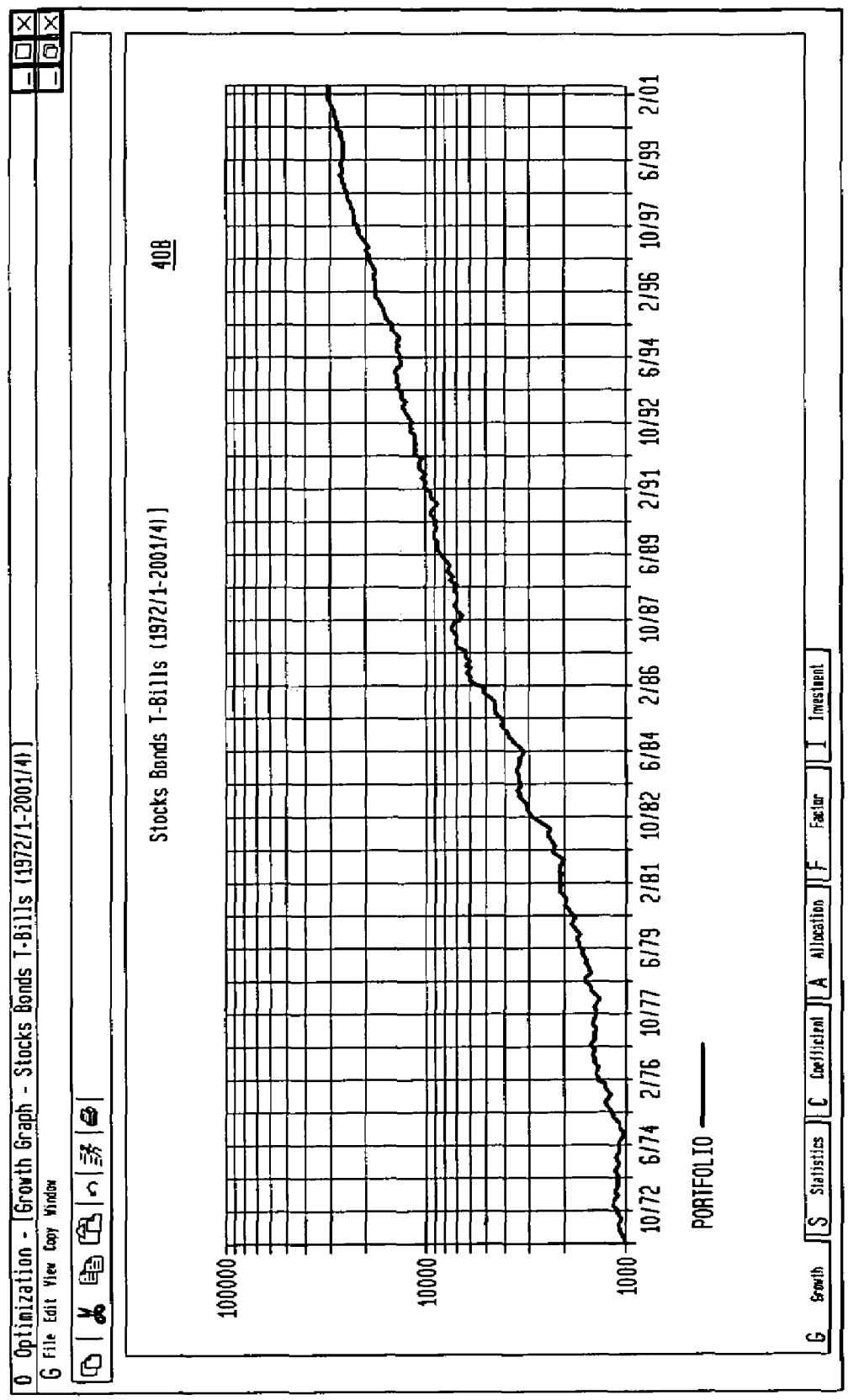
FIG. 12 is an example of a report screen containing graphical information concerning the historical return on the investments of the portfolio in accordance with one or more aspects of the present invention.

The investor is preferably permitted to obtain other reports, such as a portfolio growth report screen 408 shown in FIG. 12. By way of example, the growth report screen 408 is an historical (and/or forecasted) graph showing the past and/or future growth of the investment portfolio. Again, the investor is preferably permitted to view the growth report screen 408 on the display/data input device 120.

Preferably, the investor is also permitted to access to a statistical performance report screen 410. e.g., by way of the display/data input device 120 as shown in FIG. 13. The statistical performance report screen 410 preferably includes a number of statistical quantities for each of the investments as well as the portfolio as a whole. These statistical quantities preferably include a one month arithmetic average, a 12 month arithmetic average, a one month geometric average, a 12 month geometric average, a highest month, a 95% high, a 90% high, a 90% low, a 95% low, a lowest month, a one month mean absolute deviation, a one month standard deviation, a 12 month standard deviation, a maximum draw down, a risk free interest rate, the Sharpe ratio, etc.

In accordance with one or more further aspects of the present invention, the methods and/or functions discussed hereinabove for computing the asset allocation among the investments of the portfolio (and/or computing the asset allocation equations) may be achieved utilizing suitable hardware, such as that illustrated in FIG. 1. Preferably, such methods are achieved by employing a processor that is operable to execute instructions of one or more software programs. The one or more software programs preferably cause the processor (e.g., the data processing unit 102 of FIG. 1) to execute the actions and/or functions discussed hereinabove with respect to FIGS. 2-13. The one or more software programs are preferably operable to be stored on any of the known or hereinafter developed storage media, such as magnetic storage media, optical storage media, electronic storage media, floppy disks, optical disks, memory chips, etc. For example, the one or more software programs may be stored on storage medium 122 (FIG. 1). Advantageously, the one or more software programs may be easily transported and/or distributed to investors or other users by way of the storage media.

Advantageously, the methods and apparatus discussed hereinabove with respect to FIGS. 1-13 permit an investor to compute time varying asset allocations among the investments of the portfolio such that changes to the asset allocation may be readily computed and executed. This provides the investor with a significant advantage over prior art techniques in, for example, maximizing the return on the investments of the portfolio.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of computing a time variant allocation of assets among investments, comprising:
   establishing a plurality of investments in a portfolio among which an allocation of assets is to be made;
   establishing one or more factors to be associated with the plurality of investments, at least one of the factors having values that are time variant;
   establishing one or more allocation equations for each of the investments, each of the allocation equations being a mathematical function of the one or more factors, wherein the one or more allocation equations for each of the investments is expressed as:

$$AA_{jt} = A_j + \sum_{k=1}^{K} B_{kj} \cdot F_{kt},$$

where j is an index representing each of the plurality of investments, t is an index representing time periods, $AA_{jt}$ is an asset allocation for a jth one of the investments in time period t, k is an index representing each of the one or more factors, $F_{kt}$ represents a value of a kth one of the factors at time period t, $A_j$ is a constant associated with a jth one of the investments, K is a maximum number of the one or more factors, and $B_{kj}$ represents a coefficient for a kth one of the factors and a jth one of the investments;
   computing the constant $A_j$ and the coefficients $B_{kj}$ for each of the one or more factors using at least the historical values of the one or more factors, wherein the computation further includes determining the constant $A_j$ and the coefficients $B_{kj}$ in a way that optimizes an objective function;
   taking the objective function from the group consisting of:
   (i) minimizing a sum of the differences between a rate of return of the portfolio and a minimum rate of return threshold for the portfolio over a plurality of time periods;
   (ii) minimizing a sum of squares of the differences between the rate of return of the portfolio and the minimum rate of return threshold for the portfolio over a plurality of time periods;

(iii) minimizing a variance of the rates of return of the portfolio over a plurality of time periods;

(iv) maximizing a Sharpe ratio of the rates of return of the portfolio over a plurality of time periods; and (v) maximizing an average of the rates of return of the portfolio over a plurality of time periods; and computing a time variant allocation of assets among investments using the one or more allocation equations for each of the investments.

2. The method of claim 1, wherein the one or more allocation equations for each of the investments is expressed as:

$$AA_{jt} = A_j \cdot \prod_{k=1}^{K} F_{kt}^{\wedge}(P_{kj}),$$

where $A_j$ is a constant of proportionality associated with a jth one of the investments, K is a maximum number of the one or more factors and $P_{kj}$ represents a power for a kth one of the factors and a jth one of the investments.

3. The method of claim 1, wherein the step of computing the constant $A_j$ and the coefficients $B_{kj}$ further includes executing at least one of a linear programming routine and a quadratic programming routine to compute the constant $A_j$ and the coefficients $B_{kj}$ as a function of the historical values of the one or more factors, while tending to optimize the objective function and while satisfying the one or more constraint equations.

4. The method of claim 3, wherein the one of the linear programming routine and the quadratic programming routine is operable to compute the constant $A_j$ and the coefficients $B_{kj}$ such that positive and negative values are permitted.

5. The method of claim 3, wherein the step of computing the time variant allocation of assets further includes inputting the values of the one or more factors at a given time period into at least one of the allocation equations to obtain the time variant allocation of the assets among corresponding ones of the investments.

6. The method of claim 1, wherein the sum of the differences between the rate of return of the portfolio and the minimum rate of return threshold for the portfolio over a plurality of time periods, is expressed as:

$$(1/M) \cdot \sum_{t=1}^{M} (R_t - T_t),$$

where M is a maximum number of time periods over which the sum of the differences between the rate of return of the portfolio and the minimum rate of return threshold for the portfolio may be taken, $R_t$ is the rate of return of the portfolio at time period t, and $T_t$ is the minimum rate of return threshold for the portfolio at time period t.

7. The method of claim 6, wherein the step of minimizing the sum of the differences between the rate of return of the portfolio and the minimum rate of return threshold for the portfolio over a plurality of time periods, includes computing such sum only when $(R_t - T_t)$ is negative.

8. The method of claim 7, wherein the difference of the rate of return of the portfolio and the minimum rate of return threshold for the portfolio at time period t, is expressed as:

$$R_t - T_t = V_t - Z_t,$$

where $Z_t$ is the difference of $R_t$ and $T_t$ at time period t when such difference is negative and zero otherwise, and $V_t$ is the difference of $R_t$ and $T_t$ at time period t when such difference is positive and zero otherwise.

9. The method of claim 1, wherein the sum of squares of the rates of return of the portfolio, over a plurality of time periods, that fall below the minimum rate of return threshold for the portfolio, is expressed as:

$$(1/M) \cdot \sum_{t=1}^{M} (R_t - T_t)^2,$$

where M is a maximum number of time periods over which the sum of squares of the differences between the rate of return of the portfolio and the minimum rate of return threshold for the portfolio may be taken, $R_t$ is the rate of return of the portfolio at time period t, and $T_t$ is the minimum rate of return threshold for the portfolio at time period t.

10. The method of claim 9, wherein the step of minimizing the sum of the squares of the differences between the rate of return of the portfolio and the minimum rate of return threshold for the portfolio over a plurality of time periods, includes computing such sum only when $(R_t - T_t)$ is negative.

11. The method of claim 10, wherein the difference of the rate of return of the portfolio and the minimum rate of return threshold for the portfolio at time period t, is expressed as:

$$R_t - T_t = V_t - Z_t,$$

where $Z_t$ is the difference of $R_t$ and $T_t$ at time period t when such difference is negative and zero otherwise, and $V_t$ is the difference of $R_t$ and $T_t$ at time period t when such difference is positive and zero otherwise.

12. The method of claim 1, wherein the variance of the rates of return of the portfolio over a plurality of time periods, is expressed as:

$$(1/M-1)) \cdot \sum_{t=1}^{M} (R_t - R_{avg})^2,$$

where M is a maximum number of time periods over which the sum of rates of return of the portfolio may be taken, $R_t$ is the rate of return of the portfolio in time period t, and $R_{avg}$ is the average of the rates of return of the portfolio over the M time periods.

13. The method of claim 1, wherein the Sharpe ratio of the rates of return of the portfolio over a plurality of time periods, is expressed as:

$$(R_{avg} - RF) / \left( (1/(m-1)) \cdot \sum_{t=1}^{M} (R_t - R_{avg})^2 \right)^{1/2},$$

where M is a maximum number of time periods over which the sum of rates of return of the portfolio may be taken, $R_t$ is the rate of return of the portfolio in time period t, $R_{avg}$ is the average of the rates of return of the portfolio over the M time periods, and RF is a risk free interest rate available to an investor associated with the portfolio.

14. The method of claim 1, wherein the average of the rates of return of the portfolio over a plurality of time periods, is expressed as:

$$R_{avg} = (1/M) \cdot \sum_{t=1}^{M} \left( \left( \sum_{j=1}^{N} AA_{jt} \cdot y_{jt} \right) + (1 - LEV_t) \cdot I_t \right),$$

where M is a maximum number of time periods over which the sum of rates of return of the portfolio may be taken, N is a maximum number of the plurality of investments, $y_{jt}$ is a rate of return of a jth one of the investments at time period t, $LEV_t$ is a leverage ratio employed during time period t, and $I_t$ is an interest rate during time period t on money borrowed to leverage the portfolio.

15. The method of claim 14, wherein the average of the rates of return of the portfolio over a plurality of time periods, is expressed as:

$$R_{avg} = (1/M) \cdot \sum_{t=1}^{M} \left( \left( \sum_{j=1}^{N} AA_{jt} \cdot y_{jt} \right) + \right.$$
$$\left. (1 - LEV_t) \cdot I_t - \sum_{j=1}^{N} DP_{jt} \cdot CP_j - \sum_{j=1}^{N} DN_{jt} \cdot CN_j \right),$$

where $DP_{jt}$ is an absolute value of a change in allocation for investment j between time period t−1 and time period t whenever such change in allocation is positive and zero otherwise, $DN_{jt}$ is an absolute value of a change in allocation for investment j between time period t−1 and time period t whenever such change in allocation is negative and zero otherwise, $CP_j$ is a transaction cost for each unit of investment j for each transaction involving a positive change in the allocation to investment j, $CN_j$ is a transaction cost for each unit of investment j for each transaction involving a negative change in the allocation to investment j, and transaction costs for time period t=1 are zero.

16. A method of computing a time variant allocation of assets among investments, comprising:

establishing a plurality of investments in a portfolio among which an allocation of assets is to be made;

establishing one or more factors to be associated with the plurality of investments, at least one of the factors having values that are time variant;

establishing one or more allocation equations for each of the investments, each of the allocation equations being a mathematical function of the one or more factors, wherein the one or more allocation equations for each of the investments is expressed as:

$$AA_{jt} = A_j + \sum_{k=1}^{K} B_{kj} \cdot F_{kt},$$

where j is an index representing each of the plurality of investments, t is an index representing time periods, $AA_{jt}$ is an asset allocation for a jth one of the investments in time period t, k is an index representing each of the one or more factors, $F_{kt}$ represents a value of a kth one of the factors at time period t, $A_j$ is a constant associated with a jth one of the investments, K is a maximum number of the one or more factors, and $B_{kj}$ represents a coefficient for a kth one of the factors and a jth one of the investments;

computing the constant $A_j$ and the coefficients $B_{kj}$ for each of the one or more factors using at least the historical values of the one or more factors, wherein the computation further includes determining the constant $A_j$ and the coefficients $B_{kj}$ in a way that optimizes an objective function while satisfying one or more constraint equations;

taking the one or more constraint equations from the group consisting of:

(i) that a leverage ratio employed during a given time period is equal to a function of the values of the one or more factors during that time period;

(ii) that a rate of return of the portfolio in a given time period is equal to a function of the asset allocations for each investment in that time period, rates of return of the investments in that time period, a leverage ratio employed during that time period, and an interest rate during that time period on any money borrowed to leverage the portfolio;

(iii) that a sum of the asset allocations for the investments is equal to unity during a given time period;

(iv) that the sum of the asset allocations for the investments is equal to the leverage ratio during the given time period;

(v) that an average rate of return of the portfolio over a plurality of time periods is equal to an average of the rates of return of the portfolio in each of the plurality of time periods;

(vi) that the average rate of return of the portfolio over a plurality of time periods is equal to a target average rate of return for the portfolio;

(vii) that the asset allocation for a given one of the investments is less than or equal to a maximum permissible allocation for the investment as a proportion of all allocated assets;

(viii) that the asset allocation for a given one of the investments is greater than or equal to a minimum permissible allocation for the investment as a proportion of all allocated assets;

(ix) that the leverage ratio employed during a given time period is less than or equal to a maximum permissible leverage;

(x) that the leverage ratio employed during a given time period is greater than or equal to a minimum permissible leverage;

(xi) that a sum of differences between a rate of return of the portfolio and a minimum rate of return threshold for the portfolio over a plurality of time periods, is less than or equal to a maximum permissible average deviation below the minimum rate of return threshold for the portfolio;

(xii) that a sum of squares of differences between the rate of return of the portfolio and the minimum rate of return threshold for the portfolio over a plurality of time periods, is less than or equal to a maximum permissible average square deviation below the minimum rate of return threshold for the portfolio;

(xiii) that a variance of the rates of return of the portfolio over a plurality of time periods is less than or equal to a maximum permissible variance; and (xiv) that a Sharpe ratio of the rates of return of the portfolio over a plurality of time periods is greater than or equal to a minimum permissible Sharpe ratio; and computing a time variant allocation of assets among investments using the one or more allocation equations for each of the investments.

17. The method of claim 16, wherein the constraint equation (i) that the leverage ratio employed during a given time period is equal to a function of the values of the one or more factors during that time period, is expressed as:

$$LEV_t = C \prod_{k=1}^{K} F_{kt}{}^{\wedge}(P_k),$$

where $LEV_t$ is the leverage ratio employed during time period t, C is a constant associated with the leverage, and $P_k$ represents a power for a kth one of the factors.

18. The method of claim 16, wherein the constraint equation (i) that the leverage ratio employed during a given time period is equal to a function of the values of the one or more factors during that time period, is expressed as:

$$LEV_t = C + \sum_{k=1}^{K} D_k \cdot F_{kt},$$

where $LEV_t$ is the leverage ratio employed during time period t, C is a constant, and $D_k$ is a coefficient associated with a kth one of the factors.

19. The method of claim 18, wherein the step of computing the constant $A_j$, and the coefficients $B_{kj}$ for the one or more allocation equations includes simultaneously computing the constant C and the coefficients $D_k$.

20. The method of claim 19, wherein the step of simultaneously computing the constant $A_j$, the coefficients $B_{kj}$, the constant C, and the coefficients $D_k$ further includes executing at least one of a linear programming routine and a quadratic programming routine to compute the constant $A_j$, the coefficients $B_{kj}$, the constant C, and the coefficients $D_k$ as a function of the historical values of the one or more factors, while tending to optimize the objective function and while satisfying the one or more constraint equations.

21. The method of claim 20, wherein the one of the linear programming routine and the quadratic programming routine is operable to compute the constant $A_j$, the coefficients $B_{kj}$, the constant C, and the coefficients $D_k$ such that positive and negative values are permitted.

22. The method of claim 20, wherein the step of computing the time variant allocation of assets further includes inputting the values of the one or more factors into the leverage ratio equation to obtain the time variant leverage ratio.

23. The method of claim 16, wherein the constraint equation (ii) that the rate of return of the portfolio in a given time period is equal to a function of the asset allocations for each investment in that time period, rates of return of the investments in that time period, a leverage ratio employed during that time period, and an interest rate during that time period on any money borrowed to leverage the portfolio, is expressed as:

$$R_t = \left( \sum_{j=1}^{N} AA_{jt} \cdot y_{jt} \right) + (1 - LEV_t) \cdot I_t,$$

where N is a maximum number of the plurality of investments, $y_{jt}$ is a rate of return of a jth one of the investments at time period t, $LEV_t$ is a leverage ratio employed during time period t, and $I_t$ is an interest rate during time period t to be paid on money borrowed to leverage the portfolio.

24. The method of claim 23, wherein the rate of return of the portfolio in a given time period, is expressed as:

$$R_t = \left( \sum_{j=1}^{N} AA_{jt} \cdot y_{jt} \right) + (1 - LEV_t) \cdot I_t - \sum_{j=1}^{N} DP_{jt} \cdot CP_j - \sum_{j=1}^{N} DN_{jt} \cdot CN_j,$$

where $DP_{jt}$ is an absolute value of a change in allocation for investment j between time period t−1 and time period t whenever such change in allocation is positive and zero otherwise, $DN_{jt}$ is an absolute value of a change in allocation for investment j between time period t−1 and time period t whenever such change in allocation is negative and zero otherwise, $CP_j$ is a transaction cost for each unit of investment j for each transaction involving a positive change in the allocation to investment j, $CN_j$ is a transaction cost for each unit of investment j for each transaction involving a negative change in the allocation to investment j, and transaction costs for time period t=1 are zero.

25. The method of claim 16, wherein the constraint equation (iii) that the sum of the asset allocations for the investments is equal to unity during a given time period, is expressed as:

$$\sum_{j=1}^{N} AA_{jt} = 1,$$

where N is a maximum number of the plurality of investments.

26. The method of claim 16, wherein the constraint equation (iv) that the sum of the asset allocations for the investments is equal to the leverage ratio during the given time period, is expressed as:

$$\sum_{j=1}^{N} AA_{jt} = LEV_t,$$

where N is a maximum number of the plurality of investments, and $LEV_t$ is a leverage ratio employed during time period t.

27. The method of claim 16, wherein the constraint equation (v) that the average rate of return of the portfolio over a plurality of time periods is equal to an average of the rates of return of the portfolio in each of the plurality of time periods, is expressed as:

$$R_{avg} = (1/M) \cdot \sum_{t=1}^{M} R_t,$$

where $R_{avg}$ is the average of the rates of return of the portfolio over a plurality of time periods, M is a maximum number of time periods over which the sum of rates of return of the portfolio may be taken, and $R_t$ is the rate of return of the portfolio in time period t.

28. The method of claim 16, wherein the constraint equation (vi) that the average rate of return of the portfolio over a plurality of time periods is equal to a target average rate of return for the portfolio, is expressed as:

$$R_{avg} = R_{target} = (1/M) \cdot \sum_{t=1}^{M} R_t,$$

where $R_{avg}$ is the average of the rates of return of the portfolio over a plurality of time periods, $R_{target}$ is a desired target average rate of return for the portfolio, M is a maximum number of time periods over which the sum of rates of return of the portfolio may be taken, and $R_t$ is the rate of return of the portfolio in time period t.

29. The method of claim 16, wherein the constraint equation (vii) that the asset allocation for a given one of the investments is less than or equal to about a maximum permissible allocation for the investment, is expressed as:

$$AA_{j,t} \text{amax}_j \cdot LEV_t,$$

where $\text{amax}_j$ is a maximum permissible allocation as a proportion of all allocated assets for a jth one of the investments, and $LEV_t$ is a leverage ratio employed during time period t.

30. The method of claim 16, wherein the constraint equation (viii) that the asset allocation for a given one of the investments is greater than or equal to about a minimum permissible allocation for the investment, is expressed as:

$$AA_{j,t} \text{amin}_j \cdot LEV_t,$$

where $\text{amin}_j$ is a minimum permissible allocation as a proportion of all allocated assets for a jth one of the investments, and $LEV_t$ is a leverage ratio employed during time period t.

31. The method of claim 16, wherein the constraint equation (xi) that the sum of the differences between the rate of return of the portfolio and a minimum rate of return threshold for the portfolio over a plurality of time periods, is less than or equal to a maximum permissible average deviation below the minimum rate of return threshold for the portfolio, is expressed as:

$$(1/M) \cdot \sum_{t=1}^{M} |Z_t| \leq DEV_{max},$$

where M is a maximum number of time periods over which the sum of rates of return of the portfolio may be taken, $Z_t$ is a difference of the rate of return of the portfolio and the minimum rate of return threshold for the portfolio at time period t, and $DEV_{max}$ is the maximum permissible average deviation below the minimum rate of return threshold.

32. The method of claim 31, wherein the sum of $Z_t$ is computed only for negative values of $Z_t=(R_t-T_t)$, where $R_t$ is the rate of return of the portfolio at time period t, and $T_t$ is the minimum rate of return threshold for the portfolio.

33. The method of claim 16, wherein the constraint equation (xii) that the sum of squares of the differences between the rate of return of the portfolio and the minimum rate of return threshold for the portfolio over a plurality of time periods, is less than or equal to a maximum permissible average square deviation below the minimum rate of return threshold for the portfolio, is expressed as:

$$(1/M) \cdot \sum_{t=1}^{M} Z_t^2 \leq DEV_{max}^2,$$

where M is a maximum number of time periods over which the sum of squares of rates of return of the portfolio may be taken, $Z_t$ is a difference of the rate of return of the portfolio and the minimum rate of return threshold for the portfolio at time period t, and $DEV^2_{max}$ is the maximum permissible average square deviation below the minimum rate of return threshold.

34. The method of claim 33, wherein the sum of $Z_t^2$ is computed only for negative values of $Z_t=(R_t-T_t)$, where $R_t$ is the rate of return of the portfolio at time period t, and $T_t$ is the minimum rate of return threshold for the portfolio.

35. The method of claim 16, wherein the constraint equation (xiii) that the variance of the rates of return of the portfolio over a plurality of time periods is less than or equal to a maximum permissible variance, is expressed as:

$$(1/(M-1)) \cdot \sum_{t=1}^{M} (R_t - R_{avg})^2 \leq VAR_{max},$$

where M is a maximum number of time periods over which the sum of rates of return of the portfolio may be taken, $R_t$ is the rate of return of the portfolio in time period t, $R_{avg}$ is the average of the rates of return of the portfolio over a plurality of time periods, and $VAR_{max}$ is the maximum permissible variance.

36. The method of claim 16, wherein the constraint equation (xiv) that the Sharpe ratio of the rates of return of the portfolio over a plurality of time periods is greater than or equal to a minimum permissible Sharpe ratio, is expressed as:

$$(R_{avg} - RF) / \left( (1/(M-1)) \cdot \sum_{t=1}^{M} (R_t - R_{avg})^2 \right)^{1/2} \geq SHARPE_{min},$$

where M is a maximum number of time periods over which the sum of rates of return of the portfolio may be taken, $R_t$ is the rate of return of the portfolio in time period t, $R_{avg}$ is the average of the rates of return of the portfolio over a plurality of time periods, RF is a risk free interest rate available to an investor associated with the portfolio, and $SHARPE_{min}$ is the minimum permissible Sharpe ratio.

37. An apparatus including at least one processing unit operable to execute one or more executable programs, the one or more executable programs causing the at least one processing unit to perform steps of computing a time variant allocation of assets among investments, comprising:
  establishing a plurality of investments in a portfolio among which an allocation of assets is to be made;
  establishing one or more factors to be associated with the plurality of investments, at least one of the factors having values that are time variant;
  establishing one or more allocation equations for each of the investments, each of the allocation equations being a mathematical function of the one or more factors, wherein the one or more allocation equations for each of the investments is expressed as:

$$AA_{jt} = A_j + \sum_{k=1}^{K} B_{kj} \cdot F_{kt},$$

where j is an index representing each of the plurality of investments, t is an index representing time periods, $AA_{jt}$ is an asset allocation for a jth one of the investments in time period t, k is an index representing each of the one or more factors, $F_{kt}$ represents a value of a kth one of the factors at time period t, $A_j$ is a constant associated with a jth one of the investments, K is a maximum number of the one or more factors, and $B_{kj}$ represents a coefficient for a kth one of the factors and a jth one of the investments;

computing the constant $A_j$ and the coefficients $B_{kj}$ for each of the one or more factors using at least the historical values of the one or more factors, wherein the computation further includes determining the constant $A_j$ and the coefficients $B_{kj}$ in a way that optimizes an objective function;

taking the objective function from the group consisting of:
(i) minimizing a sum of the differences between a rate of return of the portfolio and a minimum rate of return threshold for the portfolio over a plurality of time periods;
(ii) minimizing a sum of squares of the differences between the rate of return of the portfolio and the minimum rate of return threshold for the portfolio over a plurality of time periods;
(iii) minimizing a variance of the rates of return of the portfolio over a plurality of time periods;
(iv) maximizing a Sharpe ratio of the rates of return of the portfolio over a plurality of time periods; and
(v) maximizing an average of the rates of return of the portfolio over a plurality of time periods; and computing a time variant allocation of assets among investments using the one or more allocation equations for each of the investments.

38. The apparatus of claim 37, wherein the one or more allocation equations for each of the investments is expressed as:

$$AA_{jt} = A_j \cdot \prod_{k=1}^{K} F_{kt}^{\wedge}(P_{kj}),$$

where $A_j$ is a constant of proportionality associated with a jth one of the investments, K is a maximum number of the one or more factors and $P_{kj}$ represents a power for a kth one of the factors and a jth one of the investments.

39. The apparatus of claim 37, wherein the step of computing the constant $A_j$ and the coefficients $B_{kj}$ further includes executing at least one of a linear programming routine and a quadratic programming routine to compute the constant $A_j$ and the coefficients $B_{kj}$ as a function of the historical values of the one or more factors, while tending to optimize the objective function and while satisfying the one or more constraint equations.

40. The apparatus of claim 39, wherein the one of the linear programming routine and the quadratic programming routine is operable to compute the constant $A_j$ and the coefficients $B_{kj}$ such that positive and negative values are permitted.

41. The apparatus of claim 39, wherein the step of computing the time variant allocation of assets further includes inputting the values of the one or more factors at a given time period into at least one of the allocation equations to obtain the time variant allocation of the assets among corresponding ones of the investments.

42. The apparatus of claim 37, wherein the sum of the differences between the rate of return of the portfolio and the minimum rate of return threshold for the portfolio over a plurality of time periods, is expressed as:

$$(1/M) \cdot \sum_{t=1}^{M} (R_t - T_t),$$

where M is a maximum number of time periods over which the sum of the differences between the rate of return of the portfolio and the minimum rate of return threshold for the portfolio may be taken, $R_t$ is the rate of return of the portfolio at time period t, and $T_t$ is the minimum rate of return threshold for the portfolio at time period t.

43. The apparatus of claim 42, wherein the step of minimizing the sum of the differences between the rate of return of the portfolio and the minimum rate of return threshold for the portfolio over a plurality of time periods, includes computing such sum only when $(R_t-T_t)$ is negative.

44. The apparatus of claim 43, wherein the difference of the rate of return of the portfolio and the minimum rate of return threshold for the portfolio at time period t, is expressed as:

$$R_t - T_t = V_t - Z_t,$$

where $Z_t$ is the difference of $R_t$ and $T_t$ at time period t when such difference is negative and zero otherwise, and $V_t$ is the difference of $R_t$ and $T_t$ at time period t when such difference is positive and zero otherwise.

45. The apparatus of claim 37, wherein the sum of squares of the rates of return of the portfolio, over a plurality of time periods, that fall below the minimum rate of return threshold for the portfolio, is expressed as:

$$(1/M) \cdot \sum_{t=1}^{M} (R_t - T_t)^2,$$

where M is a maximum number of time periods over which the sum of squares of the differences between the rate of return of the portfolio and the minimum rate of return threshold for the portfolio may be taken, $R_t$ is the rate of return of the portfolio at time period t, and $T_t$ is the minimum rate of return threshold for the portfolio at time period t.

46. The apparatus of claim 45, wherein the step of minimizing the sum of the squares of the differences between the rate of return of the portfolio and the minimum rate of return threshold for the portfolio over a plurality of time periods, includes computing such sum only when $(R_t-T_t)$ is negative.

47. The apparatus of claim 46, wherein the difference of the rate of return of the portfolio and the minimum rate of return threshold for the portfolio at time period t, is expressed as:

$$R_t - T_t = V_t - Z_t,$$

where $Z_t$ is the difference of $R_t$ and $T_t$ at time period t when such difference is negative and zero otherwise, and $V_t$ is the difference of $R_t$ and $T_t$ at time period t when such difference is positive and zero otherwise.

48. The apparatus of claim 37, wherein the variance of the rates of return of the portfolio over a plurality of time periods, is expressed as:

$$(1/(M-1)) \cdot \sum_{t=1}^{M} (R_t - R_{avg})^2,$$

where M is a maximum number of time periods over which the sum of rates of return of the portfolio may be taken, $R_t$ is the rate of return of the portfolio in time period t, and $R_{avg}$ is the average of the rates of return of the portfolio over the M time periods.

49. The apparatus of claim 37, wherein the Shame ratio of the rates of return of the portfolio over a plurality of time periods, is expressed as:

$$(R_{avg} - RF) \Big/ \left[ (1/(M-1)) \cdot \sum_{t=1}^{M} (R_t - R_{avg})^2 \right]^{1/2},$$

where M is a maximum number of time periods over which the sum of rates of return of the portfolio may be taken, $R_t$ is the rate of return of the portfolio in time period t, $R_{avg}$ is the average of the rates of return of the portfolio over the M time periods, and RF is a risk free interest rate available to an investor associated with the portfolio.

50. The apparatus of claim 37, wherein the average of the rates of return of the portfolio over a plurality of time periods, is expressed as:

$$R_{avg} = (1/M) \cdot \sum_{t=1}^{M} \left[ \left( \sum_{j=1}^{N} AA_{jt} \cdot y_{jt} \right) + (1 - LEV_t) \cdot I_t \right],$$

where M is a maximum number of time periods over which the sum of rates of return of the portfolio may be taken, N is a maximum number of the plurality of investments, $y_{jt}$ is a rate of return of a jth one of the investments at time period t, $LEV_t$ is a leverage ratio employed during time period t, and $I_t$ is an interest rate during time period t on money borrowed to leverage the portfolio.

51. The apparatus of claim 50, wherein the average of the rates of return of the portfolio over a plurality of time periods, is expressed as:

$$R_{avg} = (1/M) \cdot \sum_{t=1}^{M} \left[ \left( \sum_{j=1}^{N} AA_{jt} \cdot y_{jt} \right) + (1 - LEV_t) \cdot I_t - \sum_{j=1}^{N} DP_{jt} \cdot CP_j - \sum_{j=1}^{N} DN_{jt} \cdot CN_j \right],$$

where $DP_{jt}$ is an absolute value of a change in allocation for investment j between time period t−1 and time period t whenever such change in allocation is positive and zero otherwise, $DN_{jt}$ is an absolute value of a change in allocation for investment j between time period t−1 and time period t whenever such change in allocation is negative and zero otherwise, $CP_j$ is a transaction cost for each unit of investment j for each transaction involving a positive change in the allocation to investment j, $CN_j$ is a transaction cost for each unit of investment j for each transaction involving a negative change in the allocation to investment j, and transaction costs for time period t=1 are zero.

52. An apparatus including at least one processing unit operable to execute one or more executable programs, the one or more executable programs causing the at least one processing unit to perform steps of computing a time variant allocation of assets among investments, comprising:

establishing a plurality of investments in a portfolio among which an allocation of assets is to be made;

establishing one or more factors to be associated with the plurality of investments, at least one of the factors having values that are time variant;

establishing one or more allocation equations for each of the investments, each of the allocation equations being a mathematical function of the one or more factors, wherein the one or more allocation equations for each of the investments is expressed as:

$$AA_{jt} = A_j + \sum_{k=1}^{K} B_{kj} \cdot F_{kt},$$

where j is an index representing each of the plurality of investments, t is an index representing time periods, $AA_{jt}$ is an asset allocation for a jth one of the investments in time period t, k is an index representing each of the one or more factors, $F_{kt}$ represents a value of a kth one of the factors at time period t, $A_j$ is a constant associated with a jth one of the investments, K is a maximum number of the one or more factors, and $B_{kj}$ represents a coefficient for a kth one of the factors and a jth one of the investments;

computing the constant $A_j$ and the coefficients $B_{kj}$ for each of the one or more factors using at least the historical values of the one or more factors, wherein the computation further includes determining the constant $A_j$ and the coefficients $B_{kj}$ in a way that optimizes an objective function while satisfying one or more constraint equations;

taking the one or more constraint equations from the group consisting of:

(i) that a leverage ratio employed during a given time period is equal to a function of the values of the one or more factors during that time period;

(ii) that a rate of return of the portfolio in a given time period is equal to a function of the asset allocations for each investment in that time period, rates of return of the investments in that time period, a leverage ratio employed during that time period, and an interest rate during that time period on any money borrowed to leverage the portfolio;

(iii) that a sum of the asset allocations for the investments is equal to unity during a given time period;

(iv) that the sum of the asset allocations for the investments is equal to the leverage ratio during the given time period;

(v) that an average rate of return of the portfolio over a plurality of time periods is equal to an average of the rates of return of the portfolio in each of the plurality of time periods;

(vi) that the average rate of return of the portfolio over a plurality of time periods is equal to a target average rate of return for the portfolio;
(vii) that the asset allocation for a given one of the investments is less than or equal to a maximum permissible allocation for the investment as a proportion of all allocated assets;
(viii) that the asset allocation for a given one of the investments is greater than or equal to a minimum permissible allocation for the investment as a proportion of all allocated assets;
(ix) that the leverage ratio employed during a given time period is less than or equal to a maximum permissible leverage;
(x) that the leverage ratio employed during a given time period is greater than or equal to a minimum permissible leverage;
(xi) that a sum of differences between a rate of return of the portfolio and a minimum rate of return threshold for the portfolio over a plurality of time periods, is less than or equal to a maximum permissible average deviation below the minimum rate of return threshold for the portfolio;
(xii) that a sum of squares of differences between the rate of return of the portfolio and the minimum rate of return threshold for the portfolio over a plurality of time periods, is less than or equal to a maximum permissible average square deviation below the minimum rate of return threshold for the portfolio;
(xiii) that a variance of the rates of return of the port folio over a plurality of time periods is less than or equal to a maximum permissible variance; and
(xiv) that a Sharpe ratio of the rates of return of the portfolio over a plurality of time periods is greater than or equal to a minimum permissible Sharpe ratio; and computing a time variant allocation of assets among investments using the one or more allocation equations for each of the investments.

53. The apparatus of claim 52, wherein the constraint equation (i) that the leverage ratio employed during a given time period is equal to a fUnction of the values of the one or more factors during that time period, is expressed as:

$$LEV_t = C \prod_{k=1}^{K} F_{kt}^{\wedge}(P_k),$$

where $LEV_t$ is the leverage ratio employed during time period t, C is a constant associated with the leverage, and $P_k$ represents a power for a kth one of the factors.

54. The apparatus of claim 52, wherein the constraint equation (i) that the leverage ratio employed during a given time period is equal to a function of the values of the one or more factors during that time period, is expressed as:

$$LEV_t = C + \sum_{k=1}^{K} D_k \cdot F_{kt},$$

where $LEV_t$ is the leverage ratio employed during time period t, C is a constant, and $D_k$ is a coefficient associated with a kth one of the factors.

55. The apparatus of claim 54, wherein the step of computing the constant $A_j$, and the coefficients $B_{kj}$ for the one or more allocation equations includes simultaneously computing the constant C and the coefficients $D_k$.

56. The apparatus of claim 55, wherein the step of simultaneously computing the constant $A_j$, the coefficients $B_{kj}$, the constant C, and the coefficients $D_k$ further includes executing at least one of a linear programming routine and a quadratic programming routine to compute the constant $A_j$, the coefficients $B_{kj}$, the constant C, and the coefficients $D_k$ as a function of the historical values of the one or more factors, while tending to optimize the objective function and while satisfying the one or more constraint equations.

57. The apparatus of claim 56, wherein the one of the linear programming routine and the quadratic programming routine is operable to compute the constant $A_j$, the coefficients $B_{kj}$, the constant C, and the coefficients $D_k$ such that positive and negative values are permitted.

58. The apparatus of claim 56, wherein the step of computing the time variant allocation of assets further includes inputting the values of the one or more factors into the leverage ratio equation to obtain the time variant leverage ratio.

59. The apparatus of claim 52, wherein the constraint equation (ii) that the rate of return of the portfolio in a given time period is equal to a function of the asset allocations for each investment in that time period, rates of return of the investments in that time period, a leverage ratio employed during that time period, and an interest rate during that time period on any money borrowed to leverage the portfolio, is expressed as:

$$R_t = \left(\sum_{j=1}^{N} AA_{jt} \cdot y_{jt}\right) + (1 - LEV_t) \cdot I_t,$$

where N is a maximum number of the plurality of investments, $y_{jt}$ is a rate of return of a jth one of the investments at time period t, $LEV_t$ is a leverage ratio employed during time period t, and $I_t$ is an interest rate during time period t to be paid on money borrowed to leverage the portfolio.

60. The apparatus of claim 59, wherein the rate of return of the portfolio in a given time period, is expressed as:

$$R_t = \left(\sum_{j=1}^{N} AA_{jt} \cdot y_{jt}\right) + (1 - LEV_t) \cdot I_t - \sum_{j=1}^{N} DP_{jt} \cdot CP_j - \sum_{j=1}^{N} DN_{jt} \cdot CN_j,$$

where $DP_{jt}$ is an absolute value of a change in allocation for investment j between time period t−1 and time period t whenever such change in allocation is positive and zero otherwise, $DN_{jt}$ is an absolute value of a change in allocation for investment j between time period t−1 and time period t whenever such change in allocation is negative and zero otherwise, $CP_j$ is a transaction cost for each unit of investment j for each transaction involving a positive change in the allocation to investment j, $CN_j$ is a transaction cost for each unit of investment j for each transaction involving a negative change in the allocation to investment j, and transaction costs for time period t=1 are zero.

61. The apparatus of claim 52, wherein the constraint equation (iii) that the sum of the asset allocations for the investments is equal to unity during a given time period, is expressed as:

$$\sum_{j=1}^{N} AA_{jt} = 1,$$

where N is a maximum number of the plurality of investments.

62. The apparatus of claim 52, wherein the constraint equation (iv) that the sum of the asset allocations for the investments is equal to the leverage ratio during the given time period, is expressed as:

$$\sum_{j=1}^{N} AA_{jt} = LEV_t,$$

where N is a maximum number of the plurality of investments, and $LEV_t$ is a leverage ratio employed during time period t.

63. The apparatus of claim 52, wherein the constraint equation (v) that the average rate of return of the portfolio over a plurality of time periods is equal to an average of the rates of return of the portfolio in each of the plurality of time periods, is expressed as:

$$R_{avg} = (1/M) \cdot \sum_{i=1}^{M} R_t,$$

where $R_{avg}$ is the average of the rates of return of the portfolio over a plurality of time periods, M is a maximum number of time periods over which the sum of rates of return of the portfolio may be taken, and $R_t$ is the rate of return of the portfolio in time period t.

64. The apparatus of claim 52, wherein the constraint equation (vi) that the average rate of return of the portfolio over a plurality of time periods is equal to a target average rate of return for the portfolio, is expressed as:

$$R_{avg} = R_{target} = (1/M) \cdot \sum_{i=1}^{M} R_t,$$

where $R_{avg}$ is the average of the rates of return of the portfolio over a plurality of time periods, $R_{target}$ is a desired target average rate of return for the portfolio, M is a maximum number of time periods over which the sum of rates of return of the portfolio may be taken, and $R_t$ is the rate of return of the portfolio in time period t.

65. The apparatus of claim 52, wherein the constraint equation (vii) that the asset allocation for a given one of the investments is less than or equal to about a maximum permissible allocation for the investment, is expressed as:

$$AA_{jt} \geq amax_j \cdot LEV_t,$$

where $amax_j$ is a maximum permissible allocation as a proportion of all allocated assets for a jth one of the investments, and $LEV_t$ is a leverage ratio employed during time period t.

66. The apparatus of claim 52, wherein the constraint equation (viii) that the asset allocation for a given one of the investments is greater than or equal to about a minimum permissible allocation for the investment, is expressed as:

$$AA_{jt} \geq amin_j \cdot LEV_t,$$

where $amin_j$ is a minimum permissible allocation as a proportion of all allocated assets for a jth one of the investments, and $LEV_t$ is a leverage ratio employed during time period t.

67. The apparatus of claim 52, wherein the constraint equation (xi) that the sum of the differences between the rate of return of the portfolio and a minimum rate of return threshold for the portfolio over a plurality of time periods, is less than or equal to a maximum permissible average deviation below the minimum rate of return threshold for the portfolio, is expressed as:

$$(1/M) \cdot \sum_{i=1}^{M} |Z_t| \leq DEV_{max},$$

where M is a maximum number of time periods over which the sum of rates of return of the portfolio may be taken, $Z_t$ is a difference of the rate of return of the portfolio and the minimum rate of return threshold for the portfolio at time period t, and $DEV_{max}$ is the maximum permissible average deviation below the minimum rate of return threshold.

68. The apparatus of claim 67, wherein the sum of $Z_t$ is computed only for negative values of $Z_t = (R_t - T_t)$, where $R_t$ is the rate of return of the portfolio at time period t, and $T_t$ is the minimum rate of return threshold for the portfolio.

69. The apparatus of claim 52, wherein the constraint equation (xii) that the sum of squares of the differences between the rate of return of the portfolio and the minimum rate of return threshold for the portfolio over a plurality of time periods, is less than or equal to a maximum permissible average square deviation below the minimum rate of return threshold for the portfolio, is expressed as:

$$(1/M) \cdot \sum_{i=1}^{M} Z_t^2 \leq DEV_{max}^2,$$

where M is a maximum number of time periods over which the sum of squares of rates of return of the portfolio may be taken, $Z_t$ is a difference of the rate of return of the portfolio and the minimum rate of return threshold for the portfolio at time period t, and $DEV^2_{max}$ is the maximum permissible average square deviation below the minimum rate of return threshold.

70. The apparatus of claim 69, wherein the sum of $Z_t^2$ is computed only for negative values of $Z_t = (R_t - T_t)$, where $R_t$ is the rate of return of the portfolio at time period t, and $T_t$ is the minimum rate of return threshold for the portfolio.

71. The apparatus of claim 52, wherein the constraint equation (xiii) that the variance of the rates of return of the portfolio over a plurality of time periods is less than or equal to a maximum permissible variance, is expressed as:

$$(1/(M-1)) \cdot \sum_{t=1}^{M} (R_t - R_{avg})^2 \leq VAR_{max},$$

where M is a maximum number of time periods over which the sum of rates of return of the portfolio may be taken, $R_t$ is the rate of return of the portfolio in time period t, $R_{avg}$ is the average of the rates of return of the portfolio over a plurality of time periods, and $VAR_{max}$ is the maximum permissible variance.

72. The apparatus of claim 52, wherein the constraint equation (xiv) that the Sharpe ratio of the rates of return of the portfolio over a plurality of time periods is greater than or equal to a minimum permissible Sharpe ratio, is expressed as:

$$(R_{avg} - RF) \Big/ \left[ (1/(M-1)) \cdot \sum_{t=1}^{M} (R_t - R_{avg})^2 \right]^{1/2} \geq SHARPE_{min},$$

where M is a maximum number of time periods over which the sum of rates of return of the portfolio may be taken, $R_t$ is the rate of return of the portfolio in time period t, $R_{avg}$ is the average of the rates of return of the portfolio over a plurality of time periods, RF is a risk free interest rate available to an investor associated with the portfolio, and $SHARPE_{min}$ is the minimum permissible Sharpe ratio.

73. A storage medium containing one or more executable programs, the one or more executable programs being operable to cause one or more processing units to perform steps of computing a time variant allocation of assets among investments, comprising:
   establishing a plurality of investments in a portfolio among which an allocation of assets is to be made;
   establishing one or more factors to be associated with the plurality of investments, at least one of the factors having values that are time variant;
   establishing one or more allocation equations for each of the investments, each of the allocation equations being a mathematical fUnction of the one or more factors, wherein the one or more allocation equations for each of the investments is expressed as:

$$AA_{jt} = A_j + \sum_{k=1}^{K} B_{kj} \cdot F_{kt},$$

where j is an index representing each of the plurality of investments, t is an index representing time periods, $AA_{jt}$ is an asset allocation for a jth one of the investments in time period t, k is an index representing each of the one or more factors, $F_{kt}$ represents a value of a kth one of the factors at time period t, $A_j$ is a constant associated with a jth one of the investments, K is a maximum number of the one or more factors, and $B_{kj}$ represents a coefficient for a kth one of the factors and a jth one of the investments;
   computing the constant $A_j$ and the coefficients $B_{kj}$ for each of the one or more factors using at least the historical values of the one or more factors, wherein the computation further includes determining the constant $A_j$ and the coefficients $B_{kj}$ in a way that optimizes an objective function;
   taking the objective function from the group consisting of:
   (i) minimizing a sum of the differences between a rate of return of the portfolio and a minimum rate of return threshold for the portfolio over a plurality of time periods;
   (ii) minimizing a sum of squares of the differences between the rate of return of the portfolio and the minimum rate of return threshold for the portfolio over a plurality of time periods;
   (iii) minimizing a variance of the rates of return of the portfolio over a plurality of time periods;
   (iv) maximizing a Sharpe ratio of the rates of return of the portfolio over a plurality of time periods; and
   (v) maximizing an average of the rates of return of the portfolio over a plurality of time periods; and
   computing a time variant allocation of assets among investments using the one or more allocation equations for each of the investments.

74. The storage medium of claim 73, wherein the one or more allocation equations for each of the investments is expressed as:

$$AA_{jt} = A_j \cdot \prod_{k=1}^{K} F_{kt}^{\wedge}(P_{kj}),$$

where $A_j$ is a constant of proportionality associated with a jth one of the investments, K is a maximum number of the one or more factors and $P_{kj}$ represents a power for a kth one of the factors and a jth one of the investments.

75. The storage medium of claim 73, wherein the step of computing the constant $A_j$ and the coefficients $B_{kj}$ further includes executing at least one of a linear programming routine and a quadratic programming routine to compute the constant $A_j$ and the coefficients $B_{kj}$ as a function of the historical values of the one or more factors, while tending to optimize the objective function and while satisfying the one or more constraint equations.

76. The storage medium of claim 75, wherein the one of the linear programming routine and the quadratic programming routine is operable to compute the constant $A_j$ and the coefficients $B_{kj}$ such that positive and negative values are permitted.

77. The storage medium of claim 75, wherein the step of computing the time variant allocation of assets further includes inputting the values of the one or more factors at a given time period into at least one of the allocation equations to obtain the time variant allocation of the assets among corresponding ones of the investments.

78. The storage medium of claim 73, wherein the sum of the differences between the rate of return of the portfolio and the minimum rate of return threshold for the portfolio over a plurality of time periods, is expressed as:

$$(1/M) \cdot \sum_{t=1}^{M} (R_t - T_t),$$

where M is a maximum number of time periods over which the sum of the differences between the rate of return of the portfolio and the minimum rate of return threshold for the portfolio may be taken, $R_t$ is the rate of return of the portfolio at time period t, and $T_t$ is the minimum rate of return threshold for the portfolio at time period t.

79. The storage medium of claim 78, wherein the step of minimizing the sum of the differences between the rate of return of the portfolio and the minimum rate of return threshold for the portfolio over a plurality of time periods, includes computing such sum only when $(R_t - T_t)$ is negative.

80. The storage medium of claim 79, wherein the difference of the rate of return of the portfolio and the minimum rate of return threshold for the portfolio at time period t, is expressed as:

$$R_t - T_t = V_t - Z_t,$$

where $Z_t$ is the difference of $R_t$ and $T_t$ at time period t when such difference is negative and zero otherwise, and $V_t$ is the difference of $R_t$ and $T_t$ at time period t when such difference is positive and zero otherwise.

81. The storage medium of claim 73, wherein the sum of squares of the rates of return of the portfolio, over a plurality of time periods, that fall below the minimum rate of return threshold for the portfolio, is expressed as:

$$(1/M) \cdot \sum_{t=1}^{M} (R_t - T_t)^2,$$

where M is a maximum number of time periods over which the sum of squares of the differences between the rate of return of the portfolio and the minimum rate of return threshold for the portfolio may be taken, $R_t$ is the rate of return of the portfolio at time period t, and $T_t$ is the minimum rate of return threshold for the portfolio at time period t.

82. The storage medium of claim 81, wherein the step of minimizing the sum of the squares of the differences between the rate of return of the portfolio and the minimum rate of return threshold for the portfolio over a plurality of time periods, includes computing such sum only when $(R_t - T_t)$ is negative.

83. The storage medium of claim 82, wherein the difference of the rate of return of the portfolio and the minimum rate of return threshold for the portfolio at time period t, is expressed as:

$$R_t - T_t = V_t - Z_t,$$

where $Z_t$ is the difference of $R_t$ and $T_t$ at time period t when such difference is negative and zero otherwise, and $V_t$ is the difference of $R_t$ and $T_t$ at time period t when such difference is positive and zero otherwise.

84. The storage medium of claim 73, wherein the variance of the rates of return of the portfolio over a plurality of time periods, is expressed as:

$$(1/(M-1)) \cdot \sum_{t=1}^{M} (R_t - R_{avg})^2,$$

where M is a maximum number of time periods over which the sum of rates of return of the portfolio may be taken, $R_t$ is the rate of return of the portfolio in time period t, and $R_{avg}$ is the average of the rates of return of the portfolio over the M time periods.

85. The storage medium of claim 73, wherein the Sharpe ratio of the rates of return of the portfolio over a plurality of time periods, is expressed as:

$$(R_{avg} - RF) \Big/ \left((1/(M-1)) \cdot \sum_{t=1}^{M} (R_t - R_{avg})^2\right)^{1/2},$$

where M is a maximum number of time periods over which the sum of rates of return of the portfolio may be taken, $R_t$ is the rate of return of the portfolio in time period t, $R_{avg}$ is the average of the rates of return of the portfolio over the M time periods, and RF is a risk free interest rate available to an investor associated with the portfolio.

86. The storage medium of claim 73, wherein the average of the rates of return of the portfolio over a plurality of time periods, is expressed as:

$$R_{avg} = (1/M) \cdot \sum_{t=1}^{M} \left(\left(\sum_{j=1}^{N} AA_{jt} \cdot y_{jt}\right) + (1 - LEV_t) \cdot I_t\right),$$

where M is a maximum number of time periods over which the sum of rates of return of the portfolio may be taken, N is a maximum number of the plurality of investments, $y_{jt}$ is a rate of return of a jth one of the investments at time period t, $LEV_t$ is a leverage ratio employed during time period t, $I_t$ and is an interest rate during time perod t on money borrowed to leverage the portfolio.

87. The storage medium of claim 86, wherein the average of the rates of return of the portfolio over a plurality of time periods, is expressed as:

$$R_{avg} = (1/M) \cdot \sum_{t=1}^{M} \left(\left(\sum_{j=1}^{N} AA_{jt} \cdot y_{jt}\right) + (1 - LEV_t) \cdot I_t - \sum_{j=1}^{N} DP_{jt} \cdot CP_j - \sum_{j=1}^{N} DN_{jt} \cdot CN_j\right),$$

where $DP_{jt}$ is an absolute value of a change in allocation for investment j between time period t–1 and time period t whenever such change in allocation is positive and zero otherwise, $DN_{jt}$ is an absolute value of a change in allocation for investment j between time period t–1 and time period t whenever such change in allocation is negative and zero otherwise, $CP_j$ is a transaction cost for each unit of investment j for each transaction involving a positive change in the allocation to investment j, $CN_j$ is a transaction cost for each unit of investment j for each transaction involving a negative change in the allocation to investment j, and transaction costs for time period t=1 are zero.

88. A storage medium containing one or more executable programs, the one or more executable programs being operable to cause one or more processing units to perform steps of computing a time variant allocation of assets among investments, comprising:

establishing a plurality of investments in a portfolio among which an allocation of assets is to be made;

establishing one or more factors to be associated with the plurality of investments, at least one of the factors having values that are time variant;

establishing one or more allocation equations for each of the investments, each of the allocation equations being a mathematical function of the one or more factors, wherein the one or more allocation equations for each of the investments is expressed as:

$$AA_{jt} = A_j + \sum_{k=1}^{K} B_{kj} \cdot F_{kt},$$

where j is an index representing each of the plurality of investments, t is an index representing time periods, $AA_{jt}$ is an asset allocation for a jth one of the investments in time period t, k is an index representing each of the one or more factors, $F_{kt}$ represents a value of a kth one of the factors at time period t, $A_j$ is a constant associated with a jth one of the investments, K is a maximum number of the one or more factors, and $B_{kj}$ represents a coefficient for a kth one of the factors and a jth one of the investments;

computing the constant $A_j$ and the coefficients $B_{kj}$ for each of the one or more factors using at least the historical values of the one or more factors, wherein the computation further includes determining the constant $A_j$ and the coefficients $B_{kj}$ in a way that optimizes an objective function while satisfying one or more constraint equations;

taking the one or more constraint equations from the group consisting of:

(i) that a leverage ratio employed during a given time period is equal to a function of the values of the one or more factors during that time period;

(ii) that a rate of return of the portfolio in a given time period is equal to a function of the asset allocations for each investment in that time period, rates of return of the investments in that time period, a leverage ratio employed during that time period, and an interest rate during that time period on any money borrowed to leverage the portfolio;

(iii) that a sum of the asset allocations for the investments is equal to unity during a given time period;

(iv) that the sum of the asset allocations for the investments is equal to the leverage ratio during the given time period;

(v) that an average rate of return of the portfolio over a plurality of time periods is equal to an average of the rates of return of the portfolio in each of the plurality of time periods;

(vi) that the average rate of return of the portfolio over a plurality of time periods is equal to a target average rate of return for the portfolio;

(vii) that the asset allocation for a given one of the investments is less than or equal to a maximum permissible allocation for the investment as a proportion of all allocated assets;

(viii) that the asset allocation for a given one of the investments is greater than or equal to a minimum permissible allocation for the investment as a proportion of all allocated assets;

(ix) that the leverage ratio employed during a given time period is less than or equal to a maximum permissible leverage;

(x) that the leverage ratio employed during a given time period is greater than or equal to a minimum permissible leverage;

(xi) that a sum of differences between a rate of return of the portfolio and a minimum rate of return threshold for the portfolio over a plurality of time periods, is less than or equal to a maximum permissible average deviation below the minimum rate of return threshold for the portfolio;

(xii) that a sum of squares of differences between the rate of return of the portfolio and the minimum rate of return threshold for the portfolio over a plurality of time periods, is less than or equal to a maximum permissible average square deviation below the minimum rate of return threshold for the portfolio;

(xiii) that a variance of the rates of return of the portfolio over a plurality of time periods is less than or equal to a maximum permissible variance; and (xiv) that a Sharpe ratio of the rates of return of the portfolio over a plurality of time periods is greater than or equal to a minimum permissible Sharpe ratio; and computing a time variant allocation of assets among investments using the one or more allocation equations for each of the investments.

89. The storage medium of claim 88, wherein the constraint equation (i) that the leverage ratio employed during a given time period is equal to a function of the values of the one or more factors during that time period, is expressed as:

$$LEV_t = C \prod_{k=1}^{K} F_{kt}{}^{\wedge}(P_k),$$

where $LEV_t$ is the leverage ratio employed during time period t, C is a constant associated with the leverage, and $P_k$ represents a power for a kth one of the factors.

90. The storage medium of claim 88, wherein the constraint equation (i) that the leverage ratio employed during a given time period is equal to a function of the values of the one or more factors during that time period, is expressed as:

$$LEV_t = C + \sum_{k=1}^{K} D_k \cdot F_{kt},$$

where $LEV_t$ is the leverage ratio employed during time period t, C is a constant, and $D_k$ is a coefficient associated with a kth one of the factors.

91. The storage medium of claim 90, wherein the step of computing the constant $A_j$, and the coefficients $B_{kj}$ for the one or more allocation equations includes simultaneously computing the constant C and the coefficients $D_k$.

92. The storage medium of claim 91, wherein the step of simultaneously computing the constant $A_j$, the coefficients $B_{kj}$, the constant C, and the coefficients $D_k$ further includes executing at least one of a linear programming routine and a quadratic programming routine to compute the constant $A_j$, the coefficients $B_{kj}$, the constant C, and the coefficients $D_k$ as a function of the historical values of the one or more factors, while tending to optimize the objective function and while satisfying the one or more constraint equations.

93. The storage medium of claim 92, wherein the one of the linear programming routine and the quadratic programming routine is operable to compute the constant $A_j$, the coefficients $B_{kj}$, the constant C, and the coefficients $D_k$ such that positive and negative values are permitted.

94. The storage medium of claim 92, wherein the step of computing the time variant allocation of assets further includes inputting the values of the one or more factors into the leverage ratio equation to obtain the time variant leverage ratio.

95. The storage medium of claim 88, wherein the constraint equation (ii) that the rate of return of the portfolio in a given time period is equal to a function of the asset allocations for each investment in that time period, rates of return of the investments in that time period, a leverage ratio employed during that time period, and an interest rate during that time period on any money borrowed to leverage the portfolio, is expressed as:

$$R_t = \left(\sum_{j=1}^{N} AA_{jt} \cdot y_{jt}\right) + (1 - LEV_t) \cdot I_t,$$

where N is a maximum number of the plurality of investments, $y_{jt}$ is a rate of return of a jth one of the investments at time period t, $LEV_t$ is a leverage ratio employed during time period t, and $I_t$ is an interest rate during time period t to be paid on money borrowed to leverage the portfolio.

96. The storage medium of claim 95, wherein the rate of return of the portfolio in a given time period, is expressed as:

$$R_t = \left(\sum_{j=1}^{N} AA_{jt} \cdot y_{jt}\right) + (1 - LEV_t) \cdot I_t - \sum_{j=1}^{N} DP_{jt} \cdot CP_j - \sum_{j=1}^{N} DN_{jt} \cdot CN_j,$$

where $DP_{jt}$ is an absolute value of a change in allocation for investment j between time period t−1 and time period t whenever such change in allocation is positive and zero otherwise, $DN_{jt}$ is an absolute value of a change in allocation for investment j between time period t−1 and time period t whenever such change in allocation is negative and zero otherwise, $CP_j$ is a transaction cost for each unit of investment j for each transaction involving a positive change in the allocation to investment j, $CN_j$ is a transaction cost for each unit of investment j for each transaction involving a negative change in the allocation to investment j, and transaction costs for time period t=1 are zero.

97. The storage medium of claim 88, wherein the constraint equation (iii) that the sum of the asset allocations for the investments is equal to unity during a given time period, is expressed as:

$$\sum_{j=1}^{N} AA_{jt} = 1,$$

where N is a maximum number of the plurality of investments.

98. The storage medium of claim 88, wherein the constraint equation (iv) that the sum of the asset allocations for the investments is equal to the leverage ratio during the given time period, is expressed as:

$$\sum_{j=1}^{N} AA_{jt} = LEV_t,$$

where N is a maximum number of the plurality of investments, and $LEV_t$ is a leverage ratio employed during time period t.

99. The storage medium of claim 88, wherein the constraint equation (v) that the average rate of return of the portfolio over a plurality of time periods is equal to an average of the rates of return of the portfolio in each of the plurality of time periods, is expressed as:

$$R_{avg} = (1/M) \cdot \sum_{t=1}^{M} R_t,$$

where $R_{avg}$ is the average of the rates of return of the portfolio over a plurality of time periods, M is a maximum number of time periods over which the sum of rates of return of the portfolio may be taken, and $R_t$ is the rate of return of the portfolio in time period t.

100. The storage medium of claim 88, wherein the constraint equation (vi) that the average rate of return of the portfolio over a plurality of time periods is equal to a target average rate of return for the portfolio, is expressed as:

$$R_{avg} = R_{target} = (1/M) \cdot \sum_{t=1}^{M} R_t,$$

where $R_{avg}$ is the average of the rates of return of the portfolio over a plurality of time periods, $R_{target}$ is a desired target average rate of return for the portfolio, M is a maximum number of time periods over which the sum of rates of return of the portfolio may be taken, and $R_t$ is the rate of return of the portfolio in time period t.

101. The storage medium of claim 88, wherein the constraint equation (vii) that the asset allocation for a given one of the investments is less than or equal to about a maximum permissible allocation for the investment, is expressed as:

$$AA_{jt} \geq amax_j \cdot LEV_t,$$

where $amax_j$ is a maximum permissible allocation as a proportion of all allocated assets for a jth one of the investments, and $LEV_t$ is a leverage ratio employed during time period t.

102. The storage medium of claim 88, wherein the constraint equation (viii) that the asset allocation for a given one of the investments is greater than or equal to about a minimum permissible allocation for the investment, is expressed as:

$$AA_{jt} \geq amin_j \cdot LEV_t,$$

where $amin_j$ is a minimum permissible allocation as a proportion of all allocated assets for a jth one of the investments, and $LEV_t$ is a leverage ratio employed during time period t.

103. The storage medium of claim 88, wherein the constraint equation (xi) that the sum of the differences between the rate of return of the portfolio and a minimum rate of return threshold for the portfolio over a plurality of time periods, is less than or equal to a maximum permissible average deviation below the minimum rate of return threshold for the portfolio, is expressed as:

$$(1/M) \cdot \sum_{t=1}^{M} |Z_t| \leq DEV_{max},$$

where M is a maximum number of time periods over which the sum of rates of return of the portfolio may be taken, $Z_t$ is a difference of the rate of return of the portfolio and the minimum rate of return threshold for the portfolio at time period t, and $DEV_{max}$ is the maximum permissible average deviation below the minimum rate of return threshold.

104. The storage medium of claim 103, wherein the sum of $Z_t$ is computed only for negative values of $Z_t=(R_t-T_t)$, where $R_t$ is the rate of return of the portfolio at time period t, and $T_t$ is the minimum rate of return threshold for the portfolio.

105. The storage medium of claim 88, wherein the constraint equation (xii) that the sum of squares of the differences between the rate of return of the portfolio and the minimum rate of return threshold for the portfolio over a plurality of time periods, is less than or equal to a maximum permissible average square deviation below the minimum rate of return threshold for the portfolio, is expressed as:

$$(1/M) \cdot \sum_{t=1}^{M} Z_t^2 \leq DEV_{max}^2,$$

where M is a maximum number of time periods over which the sum of squares of rates of return of the portfolio may be taken, $Z_t$ is a difference of the rate of return of the portfolio and the minimum rate of return threshold for the portfolio at time period t, and $DEV^2_{max}$ is the maximum permissible average square deviation below the minimum rate of return threshold.

106. The storage medium of claim 105, wherein the sum of $Z_t^2$ is computed only for negative values of $Z_t=(R_t-T_t)$, where $R_t$ is the rate of return of the portfolio at time period t, and $T_t$ is the minimum rate of return threshold for the portfolio.

107. The storage medium of claim 88, wherein the constraint equation (xiii) that the variance of the rates of return of the portfolio over a plurality of time periods is less than or equal to a maximum permissible variance, is expressed as:

$$(1/(M-1)) \cdot \sum_{t=1}^{M} (R_t - R_{avg})^2 \leq VAR_{max},$$

where M is a maximum number of time periods over which the sum of rates of return of the portfolio may be taken, $R_t$ is the rate of return of the portfolio in time period t, $R_{avg}$ is the average of the rates of return of the portfolio over a plurality of time periods, and $VAR_{max}$ is the maximum permissible variance.

108. The storage medium of claim 88, wherein the constraint equation (xiv) that the Sharpe ratio of the rates of return of the portfolio over a plurality of time periods is greater than or equal to a minimum permissible Sharpe ratio, is expressed as:

$$(R_{avg} - RF) / \left( (1/(M-1)) \cdot \sum_{t=1}^{M} (R_t - R_{avg})^2 \right)^{1/2} \geq SHARPE_{min},$$

where M is a maximum number of time periods over which the sum of rates of return of the portfolio may be taken, $R_t$ is the rate of return of the portfolio in time period t, $R_{avg}$ is the average of the rates of return of the portfolio over a plurality of time periods, RF is a risk free interest rate available to an investor associated with the portfolio, and $SHARPE_{min}$ is the minimum permissible Sharpe ratio.

* * * * *

UNITED STATES PATENT AND TRADEMARK OFFICE
CERTIFICATE OF CORRECTION

PATENT NO. : 7,346,569 B2  Page 1 of 1
APPLICATION NO. : 10/120121
DATED : March 18, 2008
INVENTOR(S) : Richard E. Oberuc It is certified that error appears in the above-identified patent and that said Letters Patent is hereby corrected as shown below:

Title Page; item (73);
The Assignee should read as follows: Richard E. Oberuc

Signed and Sealed this

Fourteenth Day of December, 2010

David J. Kappos
*Director of the United States Patent and Trademark Office*